(12) United States Patent
Maamari et al.

(10) Patent No.: US 12,603,742 B2
(45) Date of Patent: Apr. 14, 2026

(54) METHODS AND APPARATUS FOR SIGNALING CONTROL INFORMATION

(71) Applicant: Huawei Technologies Co., Ltd., Shenzhen (CN)

(72) Inventors: Diana Maamari, Palatine, IL (US); Weimin Xiao, Hoffman Estates, IL (US); Jialing Liu, Palatine, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 456 days.

(21) Appl. No.: 17/651,346

(22) Filed: Feb. 16, 2022

(65) Prior Publication Data

US 2022/0173865 A1     Jun. 2, 2022

Related U.S. Application Data

(63) Continuation of application No. PCT/US2019/046898, filed on Aug. 16, 2019.

(51) Int. Cl.
| | |
|---|---|
| *H04L 5/00* | (2006.01) |
| *H04W 72/23* | (2023.01) |

(52) U.S. Cl.
CPC .......... *H04L 5/0051* (2013.01); *H04L 5/0094* (2013.01); *H04W 72/23* (2023.01)

(58) Field of Classification Search
CPC .... H04B 7/0639; H04B 7/0456; H04B 7/063; H04W 76/27; H04W 72/21; H04W
72/535; H04W 72/1263; H04W 8/24; H04L 5/0048; H04L 5/0051; H04L 25/03898; H04L 25/0226; H04L 5/0023; H04L 5/0094
See application file for complete search history.

(56) References Cited

U.S. PATENT DOCUMENTS

| | | | | |
|---|---|---|---|---|
| 10,547,426 | B2 * | 1/2020 | Papasakellariou .... | H04L 5/0053 |
| 2011/0249648 | A1 * | 10/2011 | Jen ......................... | H04L 5/0035 |
| | | | | 455/509 |
| 2013/0163537 | A1 * | 6/2013 | Anderson ............. | H04L 1/1671 |
| | | | | 370/329 |
| 2014/0112168 | A1 * | 4/2014 | Chen ..................... | H04W 72/23 |
| | | | | 370/252 |
| 2017/0311296 | A1 * | 10/2017 | Onggosanusi ....... | H04B 7/0456 |
| 2018/0234959 | A1 * | 8/2018 | Ahn ...................... | H04W 72/20 |
| 2019/0052424 | A1 * | 2/2019 | Manolakos ........... | H04W 72/23 |
| 2019/0103907 | A1 * | 4/2019 | Yang ................. | H04L 25/03898 |
| 2019/0174527 | A1 * | 6/2019 | Park ....................... | H04L 5/0046 |
| 2019/0246421 | A1 * | 8/2019 | Zhou ......................... | H04L 5/00 |
| 2019/0281588 | A1 * | 9/2019 | Zhang ................... | H04W 52/08 |
| 2019/0320469 | A1 * | 10/2019 | Huang ................. | H04L 5/0053 |

(Continued)

FOREIGN PATENT DOCUMENTS

| | | | | | |
|---|---|---|---|---|---|
| CA | 2859961 | A1 * | 6/2013 | ............ | H04W 72/23 |
| CA | 3043817 | A1 * | 11/2019 | ............ | H04W 72/23 |

(Continued)

*Primary Examiner* — Shean Tokuta

(74) *Attorney, Agent, or Firm* — Slater Matsil, LLP

(57) ABSTRACT

A method includes transmitting, by the access node, to a user equipment (UE) served by the access node, configuration information of a sounding reference signal (SRS) resource with a set of SRS ports, and transmitting, by the access node, to the UE, an indication of a subset of the set of SRS ports of the SRS resource.

22 Claims, 10 Drawing Sheets

(56) References Cited

U.S. PATENT DOCUMENTS

| | | | | |
|---|---|---|---|---|
| 2020/0044705 A1* | 2/2020 | Sridharan | .............. | H04B 7/024 |
| 2020/0313815 A1* | 10/2020 | Sridharan | ............ | H04B 7/0404 |
| 2020/0313827 A1* | 10/2020 | Noh | ...................... | H04L 5/0023 |
| 2020/0358493 A1* | 11/2020 | Hao | ....................... | H04L 5/0048 |
| 2021/0051650 A1* | 2/2021 | Yi | ......................... | H04W 72/21 |
| 2021/0067289 A1* | 3/2021 | Zhu | ........................ | H04B 7/088 |
| 2021/0099254 A1* | 4/2021 | Babaei | ................. | H04W 72/23 |
| 2021/0119678 A1* | 4/2021 | Zhu | ..................... | H04W 52/223 |
| 2021/0234640 A1* | 7/2021 | Cirik | .................... | H04L 1/1854 |
| 2022/0109479 A1* | 4/2022 | Liu | ...................... | H04B 7/0636 |
| 2022/0166583 A1* | 5/2022 | Si | .......................... | H04L 5/0026 |
| 2022/0173865 A1* | 6/2022 | Maamari | .............. | H04W 72/23 |
| 2023/0021451 A1* | 1/2023 | Kang | ..................... | H04W 8/24 |

FOREIGN PATENT DOCUMENTS

| | | | | | |
|---|---|---|---|---|---|
| CN | 104685822 A | * | 6/2015 | ........ | H04W 72/0446 |
| CN | 110100407 A | * | 8/2019 | .............. | H04L 5/00 |
| CN | 111630805 A | * | 9/2020 | ............ | H04W 72/23 |
| CN | 113924739 A | * | 1/2022 | ......... | H04B 7/06952 |
| CN | 114270757 A | * | 4/2022 | ............ | H04W 72/23 |
| CN | 114270757 B | * | 3/2024 | ........... | H04L 5/0051 |
| EP | 3565162 A1 | | 11/2019 | | |
| EP | 3565171 A1 | | 11/2019 | | |
| TW | 202249470 A | * | 12/2022 | ......... | H04L 25/0224 |
| WO | WO-2010124588 A1 | * | 11/2010 | .............. | H04B 7/06 |
| WO | WO-2014019543 A1 | * | 2/2014 | ........... | H04W 72/21 |
| WO | WO-2016053426 A1 | * | 4/2016 | ........... | H04W 48/08 |
| WO | WO-2018097947 A2 | * | 5/2018 | ........... | H04W 72/21 |
| WO | WO-2018124685 A1 | * | 7/2018 | ........... | H04W 72/21 |
| WO | WO-2018127781 A1 | * | 7/2018 | ........... | H04W 72/21 |
| WO | WO-2018186652 A1 | * | 10/2018 | ........... | H04W 72/23 |
| WO | WO-2019022329 A1 | * | 1/2019 | .............. | H04L 1/06 |
| WO | 2019047776 A1 | | 3/2019 | | |
| WO | 2019068643 A1 | | 4/2019 | | |
| WO | WO-2019098800 A1 | * | 5/2019 | ......... | H04W 72/535 |
| WO | WO-2020032571 A1 | * | 2/2020 | .............. | H04B 7/06 |
| WO | WO-2020101780 A2 | * | 5/2020 | ........... | H04L 5/0051 |
| WO | WO-2021160800 A1 | * | 8/2021 | ........... | H04W 12/08 |
| WO | WO-2021174238 A2 | * | 9/2021 | ........... | H04L 5/0094 |
| WO | WO-2021174553 A1 | * | 9/2021 | ........... | H04B 7/0456 |
| WO | WO-2021207746 A2 | * | 10/2021 | | |
| WO | WO-2021258088 A2 | * | 12/2021 | ........... | H04L 5/0051 |
| WO | WO-2022126148 A2 | * | 6/2022 | ........... | H04L 5/0091 |

* cited by examiner

UPLINK CONNECTION

DOWNLINK CONNECTION

RECEIVE COMBINER

TRANSMIT PRECODER

300

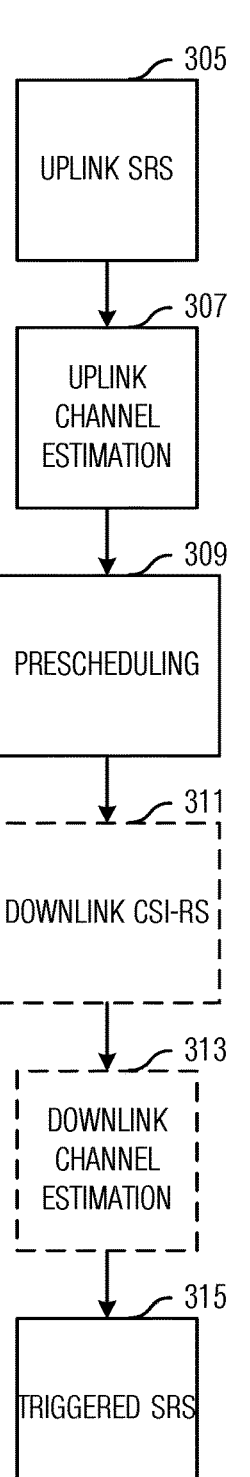

305

UPLINK SRS

- UNPRECODED FOR PURPOSE OF UL CHANNEL ESTIMATION; SENT BY ACTIVE UES TO ASSIST NETWORK IN PRESCHEDULING.
- INSTEAD OF UL SRS, FEEDBACK FROM UE MAY BE USED FOR PRESCHEDULING.

307

UPLINK CHANNEL ESTIMATION

- NETWORK ESTIMATES UL CHANNEL BASED ON UL SRS.

309

PRESCHEDULING

- NETWORK PRESCHEDULES UES, SENDS GROUP DCI FOR PRESCHEDULED UES TO TRIGGER SRS AND CSI-RS (IF CSI-RS IS TO BE SENT).
- ACTUAL SCHEDULING AND DATA TRANSMISSION IS FOLLOWED IN LATER STEPS.

311

DOWNLINK CSI-RS

- NETWORK TRANSMITS PRECODED OR UNPRECODED CSI-RS.
- CSI-RS MAY OR MAY NOT BE TRANSMITTED.

313

DOWNLINK CHANNEL ESTIMATION

- UE ESTIMATES DL CHANNEL BASED ON DL CSI-RS.

315

TRIGGERED SRS

- PRESCHEDULED UES TRANSMIT SRS.
- SRS PRECODED OR UNPRECODED (NO INFORMATION).
- SRS BASED ON RECEIVED DCI ON ASSIGNED SUBBANDS, PORTS, COMB, AND CYCLIC SHIFTS.

*Fig. 3*

METHODS AND APPARATUS FOR SIGNALING CONTROL INFORMATION

CROSS-REFERENCE TO RELATED APPLICATIONS

This application is a continuation of International Application No. PCT/US2019/046898, filed on Aug. 16, 2019, which application is hereby incorporated herein by reference.

TECHNICAL FIELD

The present disclosure relates generally to methods and apparatus for wireless communications, and, in particular embodiments, to methods and apparatus for signaling control information for sounding reference signals transmission and reception.

BACKGROUND

Sounding reference signals (SRSs) are reference signals transmitted by user equipment (UE) in the uplink for the purpose of enabling uplink channel estimation over a wide bandwidth. As such, the network may be able to perform communication with the UEs based on the uplink channel estimation. Moreover, due to channel reciprocity between the uplink and the downlink present in a time division duplex (TDD) communication system, the network may utilize the SRSs to perform dynamic scheduling. That is, the network may exploit channel-dependent scheduling. In this case, the time-frequency resources are dynamically scheduled, taking into account the different traffic priorities and quality of services requirements. Typically, the UEs monitor several Physical Downlink Control Channels (PDCCHs) to acquire the scheduling decisions, which are signaled to the UEs by the network. Upon the detection of a valid PDCCH, the UE follows the scheduling decision and receives (or transmits) data.

The configuration of SRS related parameters of a SRS to be transmitted in the uplink (such as SRS transmission ports, SRS transmission bandwidth, SRS resources sets, transmission comb and cyclic shift, etc.) are semi-static in nature and may be provided through higher layer signaling, such as radio resource control signaling. A more dynamic technique to signal the configuration is needed to better associate the SRS parameters (such as the SRS transmission bandwidth and/or ports) with the Physical Data Shared Channel (PDSCH) parameters. Moreover, the association between the downlink reference signals, such as Channel State Information Reference Signals (CSI-RS) or demodulation reference signals (DMRS), and the uplink SRS must be conveyed to the UE to accurately reflect the interference situation and perform optimal beamforming. Thus, there is a need for apparatus and methods for signaling control information that accurately indicates a more dynamic configuration (not semi-static) of the aforementioned parameters, such as, for example, a portion of the transmission bandwidth required to transmit a subset of the SRS resource set (thereby implicitly indicating a transmission comb and cyclic shift) using a subset of the transmission ports associated with a particular set of downlink reference signals. The signaling of the control information may be closely tied to an actual data transmission.

SUMMARY

According to a first aspect, a method implemented by an access node is provided. The method comprising transmitting, by the access node, to a user equipment (UE) served by the access node, configuration information of a sounding reference signal (SRS) resource with a set of SRS ports, and transmitting, by the access node, to the UE, an indication of a subset of the set of SRS ports of the SRS resource.

In a first implementation form of the method according to the first aspect as such, the indication of the subset indicating one of a plurality of subsets of SRS ports.

In a second implementation form of the method according to the first aspect as such or any preceding implementation form of the first aspect, each of the plurality of subsets of SRS ports being associated with a unique index.

In a third implementation form of the method according to the first aspect as such or any preceding implementation form of the first aspect, the indication of the subset specifying the index associated with the subset of the set of SRS ports.

In a fourth implementation form of the method according to the first aspect as such or any preceding implementation form of the first aspect, each SRS port in the set of SRS ports of the SRS resource is associated with a transmission comb, an offset associated with the transmission comb, a cyclic shift, and an orthogonal frequency division multiplex (OFDM) symbol.

In a fifth implementation form of the method according to the first aspect as such or any preceding implementation form of the first aspect, further comprising, receiving, by the access node, from the UE, a SRS transmission in accordance with the subset of the set of SRS ports.

In a sixth implementation form of the method according to the first aspect as such or any preceding implementation form of the first aspect, the configuration information being transmitted in a higher layer message.

In a seventh implementation form of the method according to the first aspect as such or any preceding implementation form of the first aspect, the indication of the subset being transmitted in a group downlink control information (DCI) message.

In an eighth implementation form of the method according to the first aspect as such or any preceding implementation form of the first aspect, the UE being one of a subset of the plurality of UEs served by the access node, the method further comprising assigning, by the access node, a UE identifier to each UE in the subset of UEs served by the access node, the UE identifiers being unique within the subset of UEs served by the access node, and transmitting, by the access node, indications of the UE identifiers of the UEs in the subset of UEs served by the access node.

In a ninth implementation form of the method according to the first aspect as such or any preceding implementation form of the first aspect, the UE identifiers being configured in a higher layer message.

In a tenth implementation form of the method according to the first aspect as such or any preceding implementation form of the first aspect, transmitting the configuration information comprising, for each UE in the subset of UEs served by the access node, transmitting, by the access node, an indication of a UE identifier associated with the UE, a transmit power control (TPC) command associated with a SRS, and SRS configuration information associated with the UE, the SRS configuration information including an indication of a subset of a set of SRS port resources and an indication of an association between SRS port resources and downlink port resources.

In an eleventh implementation form of the method according to the first aspect as such or any preceding implementation form of the first aspect, transmitting the indication of the subset comprising, for each UE in the subset of UEs served by the access node, transmitting, by the access node, a TPC command associated with the UE, and the indication of the subset.

In a twelfth implementation form of the method according to the first aspect as such or any preceding implementation form of the first aspect, transmitting the indication of the subset comprising transmitting, by the access node, a TPC command associated with the UE, and the indication.

In a thirteenth implementation form of the method according to the first aspect as such or any preceding implementation form of the first aspect, the indications of the UE identifiers being transmitted in a group DCI message.

In a fourteenth implementation form of the method according to the first aspect as such or any preceding implementation form of the first aspect, the indication of the subset being transmitted in a unicast DCI message.

According to a second aspect, a method implemented by an access node is provided. The method comprising transmitting, by the access node, to a UE, SRS configuration information, the SRS configuration information comprising associations between SRS ports and downlink ports, and transmitting, by the access node, to the UE, an indication of one of the associations between the SRS ports and the downlink ports.

In a first implementation form of the method according to the second aspect as such, the SRS ports being SRS port resources indicated as a subset of a set of an ordering of the SRS port resources.

In a second implementation form of the method according to the second aspect as such or any preceding implementation form of the second aspect, the SRS configuration information being transmitted in a higher layer message.

In a third implementation form of the method according to the second aspect as such or any preceding implementation form of the second aspect, the indication being transmitted in a group DCI message.

In a fourth implementation form of the method according to the second aspect as such or any preceding implementation form of the second aspect, the indication being transmitted in a unicast DCI message.

According to a third aspect, an access node is provided. The access node comprising a non-transitory memory storage comprising instructions, and one or more processors in communication with the memory storage. The one or more processors execute the instructions to transmit, to a UE served by the access node, configuration information of a SRS resource with a set of SRS ports, and transmit, to the UE, an indication of a subset of the set of SRS ports of the SRS resource.

In a first implementation form of the access node according to the third aspect as such, the indication of the subset indicating one of a plurality of subsets of SRS ports.

In a second implementation form of the access node according to the third aspect as such or any preceding implementation form of the third aspect, each of the plurality of subsets of SRS ports being associated with a unique index.

In a third implementation form of the access node according to the third aspect as such or any preceding implementation form of the third aspect, the indication of the subset specifying the index associated with the subset of the set of SRS ports.

In a fourth implementation form of the access node according to the third aspect as such or any preceding implementation form of the third aspect, each SRS port in the set of SRS ports of the SRS resource is associated with a transmission comb, an offset associated with the transmission comb, a cyclic shift, and an OFDM symbol.

In a fifth implementation form of the access node according to the third aspect as such or any preceding implementation form of the third aspect, the one or more processors executing the instructions to receive, from the UE, a SRS transmission in accordance with the subset of the set of SRS ports.

In a sixth implementation form of the access node according to the third aspect as such or any preceding implementation form of the third aspect, the configuration information being transmitted in a higher layer message.

In a seventh implementation form of the access node according to the third aspect as such or any preceding implementation form of the third aspect, the indication of the subset being transmitted in a group DCI message.

In an eighth implementation form of the access node according to the third aspect as such or any preceding implementation form of the third aspect, the UE being one of a subset of the plurality of UEs served by the access node, and the one or more processors executing the instructions to assign a UE identifier to each UE in the subset of UEs served by the access node, the UE identifiers being unique within the subset of UEs served by the access node, and transmit indications of the UE identifiers of the UEs in the subset of UEs served by the access node.

In a ninth implementation form of the access node according to the third aspect as such or any preceding implementation form of the third aspect, the UE identifiers being configured in a higher layer message.

In a tenth implementation form of the access node according to the third aspect as such or any preceding implementation form of the third aspect, the one or more processors executing the instructions to, for each UE in the subset of UEs served by the access node, transmit an indication of a UE identifier associated with the UE, a TPC command associated with a SRS, and SRS configuration information associated with the UE, the SRS configuration information including an indication of a subset of a set of SRS port resources and an indication of an association between SRS port resources and downlink port resources.

In an eleventh implementation form of the access node according to the third aspect as such or any preceding implementation form of the third aspect, the one or more processors executing the instructions to, for each UE in the subset of UEs served by the access node, transmit a TPC command associated with the UE, and the indication of the subset.

In a twelfth implementation form of the access node according to the third aspect as such or any preceding implementation form of the third aspect, the one or more processors executing the instructions to transmit a TPC command associated with the UE, and the indication.

In a thirteenth implementation form of the access node according to the third aspect as such or any preceding implementation form of the third aspect, the indications of the UE identifiers being transmitted in a group DCI message.

In a fourteenth implementation form of the access node according to the third aspect as such or any preceding implementation form of the third aspect, the indication of the subset being transmitted in a unicast DCI message.

According to a fourth aspect, an access node is provided. The access node comprising a non-transitory memory storage comprising instructions, and one or more processors in communication with the memory storage. The one or more processors execute the instructions to transmit, to a UE, SRS configuration information, the SRS configuration information comprising associations between SRS ports and downlink ports, and transmit, to the UE, an indication of one of the associations between the SRS ports and the downlink ports.

In a first implementation form of the access node according to the fourth aspect as such, the SRS ports being SRS port resources indicated as a subset of a set of an ordering of the SRS port resources.

In a second implementation form of the access node according to the fourth aspect as such or any preceding implementation form of the fourth aspect, the SRS configuration information being transmitted in a higher layer message.

In a third implementation form of the access node according to the fourth aspect as such or any preceding implementation form of the fourth aspect, the indication being transmitted in a group DCI message.

In a fourth implementation form of the access node according to the fourth aspect as such or any preceding implementation form of the fourth aspect, the indication being transmitted in a unicast DCI message.

According to a fifth aspect, a method implemented by a UE is provided. The method comprising receiving, by the UE, from an access node, configuration information of a SRS resource with a set of SRS ports, and receiving, by the UE, from the access node, an indication of a subset of the set of SRS ports of the SRS resource.

In a first implementation form of the method according to the fifth aspect as such, the indication of the subset indicating one of a plurality of subsets of SRS ports.

In a second implementation form of the method according to the fifth aspect as such or any preceding implementation form of the fifth aspect, each of the plurality of subsets of SRS ports being associated with a unique index.

In a third implementation form of the method according to the fifth aspect as such or any preceding implementation form of the fifth aspect, the indication of the subset specifying the index associated with the subset of the set of SRS ports.

In a fourth implementation form of the method according to the fifth aspect as such or any preceding implementation form of the fifth aspect, each SRS port in the set of SRS ports of the SRS resource is associated with a transmission comb, an offset associated with the transmission comb, a cyclic shift, and an OFDM symbol.

In a fifth implementation form of the method according to the fifth aspect as such or any preceding implementation form of the fifth aspect, further comprising, transmitting, by the UE, to the access node, a SRS transmission in accordance with the subset of the set of SRS ports.

In a sixth implementation form of the method according to the fifth aspect as such or any preceding implementation form of the fifth aspect, the configuration information being received in a higher layer message.

In a seventh implementation form of the method according to the fifth aspect as such or any preceding implementation form of the fifth aspect, the indication of the subset being received in a group DCI message.

In an eighth implementation form of the method according to the fifth aspect as such or any preceding implementation form of the fifth aspect, the UE being one of a subset of a plurality of UEs served by the access node, the method further comprising receiving, by the UE, an indication of a UE identifier of the UE.

In a ninth implementation form of the method according to the fifth aspect as such or any preceding implementation form of the fifth aspect, the UE identifiers being configured in a higher layer message.

In a tenth implementation form of the method according to the fifth aspect as such or any preceding implementation form of the fifth aspect, receiving the configuration information comprising receiving the UE identifier of the UE, a TPC command associated with a SRS, and SRS configuration information associated with the UE, the SRS configuration information including an indication of a subset of a set of SRS port resources and an indication of an association between SRS port resources and downlink port resources.

In an eleventh implementation form of the method according to the fifth aspect as such or any preceding implementation form of the fifth aspect, receiving the indication of the subset comprising receiving a TPC command associated with the UE, and the indication of the subset.

In a twelfth implementation form of the method according to the fifth aspect as such or any preceding implementation form of the fifth aspect, receiving the indication of the subset comprising receiving a TPC command associated with the UE, and the indication of the subset.

In a thirteenth implementation form of the method according to the fifth aspect as such or any preceding implementation form of the fifth aspect, the indications of the UE identifiers being received in a group DCI message.

In a fourteenth implementation form of the method according to the fifth aspect as such or any preceding implementation form of the fifth aspect, the indication of the subset being received in a unicast DCI message.

According to a sixth aspect, a method implemented by a UE is provided. The method comprising receiving, by the UE, from an access node, SRS configuration information, the SRS configuration information comprising associations between SRS ports and downlink ports, and receiving, by the UE, from the access node, an indication of one of the associations between the SRS ports and the downlink ports.

In a first implementation form of the method according to the sixth aspect as such, the SRS ports being SRS port resources indicated as a subset of a set of an ordering of the SRS port resources.

In a second implementation form of the method according to the sixth aspect as such or any preceding implementation form of the sixth aspect, the SRS configuration information being received in a higher layer message.

In a third implementation form of the method according to the sixth aspect as such or any preceding implementation form of the sixth aspect, the indication being received in a group DCI message.

In a fourth implementation form of the method according to the sixth aspect as such or any preceding implementation form of the sixth aspect, the indication being received in a unicast DCI message.

In accordance with one aspect, a method is provided that includes transmitting by the network to the UEs SRS in RRC signaling configuration information of ports, SRS transmission bandwidth, resource sets of SRSs, transmission comb and cyclic shift and further dynamically configuring a portion of the aforementioned (subset of the transmission bandwidth, subset of the SRS resource sets, a particular transmission comb and cyclic shift) using a downlink message.

In accordance with one aspect, a method is provided that includes transmitting by the network to the UE SRS in radio resource control RRC signaling configuration information of possible SRS resources/ports arrangement (distribution, packing, configuration, assignments) and further dynamically configuring a particular SRS resources/ports for each UE using downlink message.

In accordance with one aspect, a method is provided that includes transmitting by the network to the UE SRS in radio resource control RRC signaling configuration information of SRS ports and/or CSI-RS transmission ports associated with the SRS ports and further dynamically configuring a particular mapping of the aforementioned relationship using downlink message.

In accordance with one aspect, a method is provided that includes transmitting by the network to the UE SRS in radio resource control RRC signaling configuration information of SRS ports and/or DMRS transmission ports associated with the SRS ports and further dynamically configuring a particular mapping of the aforementioned relationship using downlink message.

In accordance with one aspect, a method is provided that includes receiving by the UE through RRC configuration information. The configuration information includes information regarding the SRS resource sets, SRS transmission bandwidth, SRS ports, SRS transmission comb, cyclic shift and information of a mapping between transmission ports (such as CSI-RS, DMRS) associated with the SRS ports and further dynamically configuring portion of the aforementioned using downlink message.

Optionally, in any of the preceding aspects, the downlink message is a DCI message.

Optionally the downlink message is Group DCI and the Group DCI format includes fields specific to prescheduled (or scheduled) UEs. The Group DCI has fields specifying the frequency and time resources (resource block groups), the SRS resource set, SRS ports, transmission comb and cyclic shift, CSI-RS associated with the triggered SRS, DMRS associated with the triggered SRS.

Optionally the group DCI has fields to identify the prescheduled (or scheduled) UEs which may be subset of configured (or active UEs)

Optionally the downlink message is DCI format 0_1 or DCI format 1_1 or other DCI formats in 5G NR with modified/added fields that dynamically signal the aforementioned parameters.

An advantage of a preferred embodiment is that control information, such as the SRS transmission bandwidth, SRS transmission ports, and SRS resource sets including the SRS transmission comb and cyclic shift, are dynamically signaled for prescheduled (or scheduled) UEs after configuration through higher layer signaling, such as, for example, through radio resource control (RRC) or media access control (MAC) control element (CE) signaling.

Yet another advantage of a preferred embodiment is that dynamic signaling of the control information does not significantly increase the communications overhead, thereby minimizing the impact on the overall performance of the communications system.

In yet another advantage, the present disclosure associates SRS configured parameters (SRS transmission bandwidth and/or ports) with the Physical Downlink Shared Control Channel (PDSCH) parameters (bandwidth and/or ports) and/or the CSI-RS parameters (bandwidth and/or ports).

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a flow diagram of operations occurring in interference probing process according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
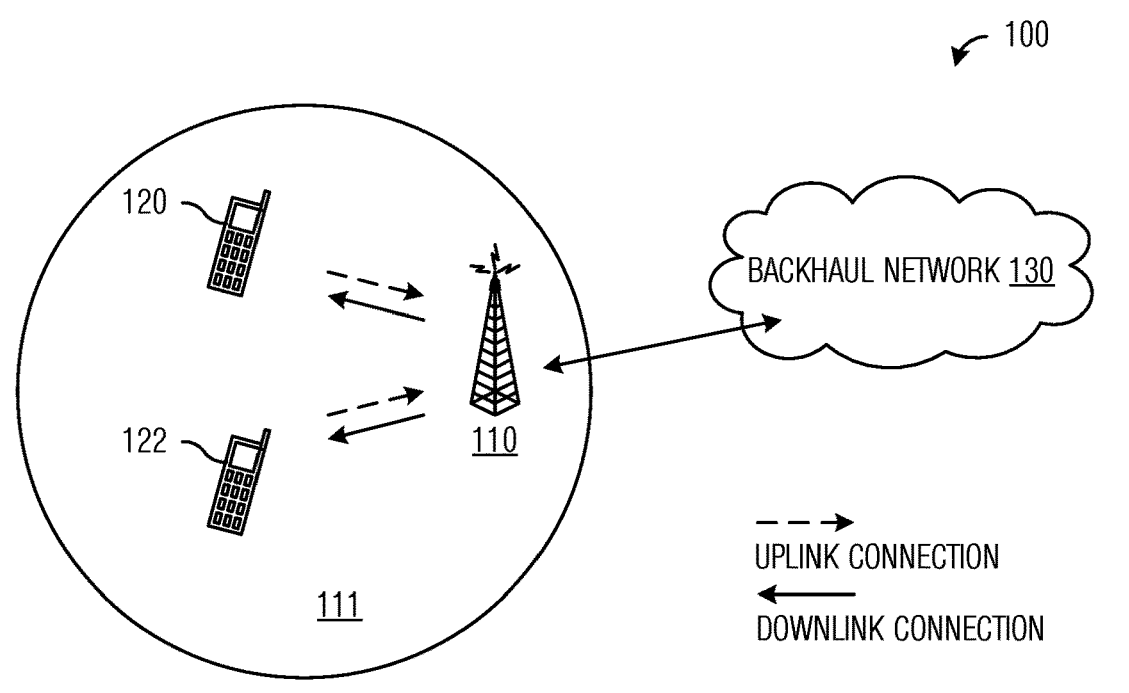
FIG. 1 illustrates an example wireless communication system.

FIG. 1 illustrates an example wireless communication system 100. Communication system 100 includes an access node 110 with coverage area 111. Access node 110 serves a plurality of user equipments (UEs), including UE 120 and UE 122. Transmissions from access node 110 to a UE is referred to as a downlink (DL) transmission and occurs over a downlink channel (shown in FIG. 1 as a solid arrowed line), while transmissions from a UE to access node 110 is referred to as an uplink (UL) transmission and occurs over an uplink channel (shown in FIG. 1 as a dashed line). Services may be provided to the plurality of UEs by service providers connected to access node 110 through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, users, subscribers, stations, communication devices, CPEs, relays, Integrated Access and Backhaul (LAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL) UL carrier which has an associated DL, and other carriers are called a supplementary UL (SUL) carriers which do not have an associated DL. A cell, or a carrier, may be configured with slot or subframe formats comprised of DL and UL symbols, and that cell or carrier is seen as operating in time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple access nodes capable of communicating with a number of UEs, only one access node, and two UEs are illustrated for simplicity.

In standard antenna element to element channel estimation, a channel between two devices is estimated by having a first device transmit a known signal on a known time or frequency resource (s) to a second device, the received signal at the second device is expressible as:

$$y=Hx+n \qquad (1)$$

where y is the received signal at the second device, x is the known signal (which may be a reference signal, a pilot, or a pilot signal), H is the channel model or response, and n is the noise (and interference for some communication channels). Because x is known by the second device, it is possible for the second device to determine or estimate H from y.

It is noted that the concept of antenna, antenna element, and antenna port may be generally interchangeable, but in some specific scenarios, they can mean different but related subjects. For example, one transmit (Tx) antenna port may be formed (or virtualized) by multiple antenna elements or antennas, and the receiver sees only the one Tx antenna port but not each of the multiple antenna elements or antennas. The virtualization may be achieved via beamforming, for example.

Figure 2:
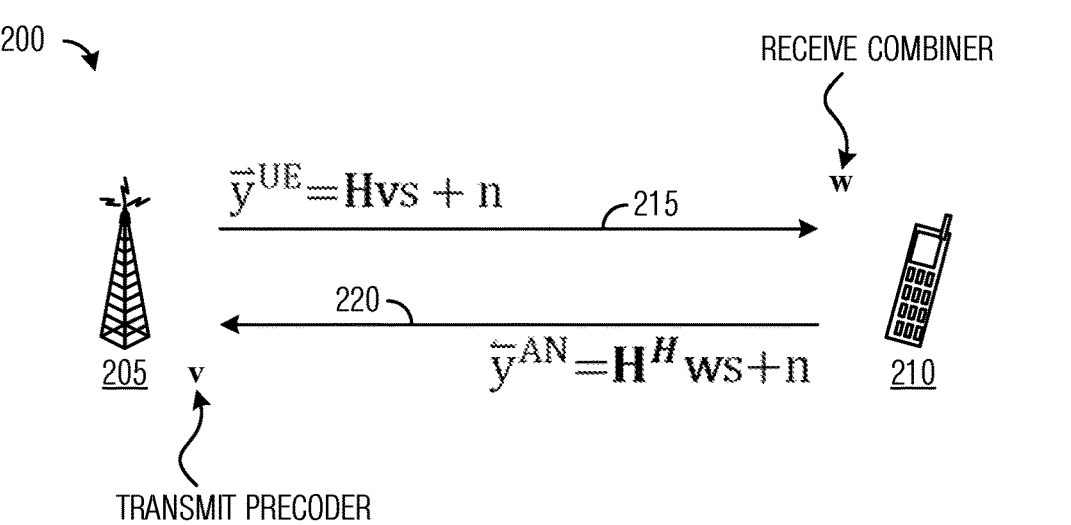
FIG. 2 illustrates an example communications system, providing mathematical expressions of signals transmitted in the communications system.

FIG. 2 illustrates an example communications system 200, providing mathematical expressions of signals transmitted in the communications system. Communications system 200 includes an access node 205 communicating with UE 210. As shown in FIG. 2, access node 205 is using a transmit filter v and UE 210 is using a receive filter w. Both access node 205 and UE 210 use linear precoding or combining. Assuming H is $N_{rx} \times N_{tx}$ matrix of a MIMO system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, streams, symbols, pilots, messages, or known sequences transmitted. The receive filter w of multi-antenna systems is of dimension $N_{rx} \times Ns$ and represents the combining matrix. It is noted that the above description is for a transmission from access node 205 to UE 210, i.e., a downlink transmission. The transmission may also occur at the reverse direction (an uplink transmission), for which the channel matrix becomes $H^H$, which is the Hermitian of channel model H, and w may be seen as the transmit filter and v as the receiver filter. The w for transmission and the w for reception may or may not be the same, and likewise for v.

A downlink (or forward) channel 215 between access node 205 and UE 210 has channel model or response H, while an uplink (or backward, or reverse) channel 220 between UE 210 and access node 205 has channel model or response $H^H$, which is the Hermitian of channel model H. Although FIG. 2 depicts only one access node and one UE, it is not limited to this case. Multiple UEs may be served by the access node, on different time-frequency resources (such as FDM-TDM, as in typical cellular systems) or on the same time-frequency resources (such as MU-MIMO, wherein multiple UEs are paired together and each UE is individually precoded). Among the paired UEs, there is intra-cell interference. Also multiple access nodes may exist in the network, some of which may be cooperatively serving UE 210 in a joint transmission fashion (such as coherent joint transmission, non-coherent joint transmission, coordinated multipoint transmission etc.), dynamic point switching fashion, and so on. Some other access nodes may not serve UE 210 and their transmissions to their UEs cause inter-cell interference to UE 210. The scenario of multiple access nodes and multiple UEs, with access node cooperation to serve a UE and with MU-MIMO, is a scenario considered herein, and the example embodiments of bi-directional training applies to this scenario.

According to an example embodiment, precoded, unprecoded, or both precoded and unprecoded uplink SRSs are transmitted by UEs to access nodes to assist in dynamic scheduling. These uplink SRSs include specific transmission parameters (such as specific transmission ports, transmission comb, cyclic shift, transmission bandwidth (related to the SRS resources), etc.) that may be configured through higher layer signaling (such as through radio resource control (RRC) or media access control (MAC) control element (CE)

signaling, for example). In some cases, the uplink SRS may be unprecoded to support uplink channel estimation and assist the network in prescheduling. Upon performing uplink channel estimation, the network preschedules UEs. The prescheduling of UEs may involve a selection of UEs from a plurality of UEs configured by the access node, where the selected UEs comprises UEs that are suitable for receiving (or transmitting) data. Hence, the selected UEs comprise a subset of the plurality of UEs configured by the access node. The selected UEs may be referred to as prescheduled UEs. The suitability of a UE may be determined based on factors such as channel quality, signal quality, error rate, data transfer history, quality of service restrictions, etc.

The prescheduling of UEs may precede an actual scheduling required for a data transmission (or reception) and the actual data transmission (or reception). In general, scheduling is not predictable. That is, the number of UEs and which subset of UEs selected for prescheduling are not known during higher layer configuration. Therefore, after prescheduling, the network may decide to re-configure the semi-static configured SRS parameters based on the subset of UEs chosen in prescheduling. As such, apparatus and methods supporting a more dynamic configuration of control signals are needed.

Interference probing and prescheduling may be performed by the network after UEs transmit the uplink SRS. As described previously, prescheduling is a process where the access node selects a subset of the UEs, which the access node has configured, for data transmission or reception. The selected UEs may be configured to transmit precoded SRSs. These precoded SRSs may be referred to as triggered SRSs. The access node may use the precoded SRSs to determine a downlink precoder (referred to as transmit filter v above). The prescheduling may precede the actual scheduling for data transmission (or reception) and may be performed during a training phase (such as for example during bi-directional training (BIT)) to determine the downlink precoder (and combiners).

BIT, also known as forward-backward training, is a generally distributed training procedure with low computational complexity that is used to train and update transmit precoders and receive combiners without explicitly estimating the CSI. BIT may adapt transmit beamformers, which may also be commonly known as transmit precoders, transmission filters, spatial transmission filters, transmit filter, analog precoder, and the like and receiver combiners (which are also commonly known as receive filter, spatial receive filters, analog combiner, and the like) in TDD MIMO communications systems. In BIT, neither device (a transmitting device or a receiving device) participating in BIT may have a priori knowledge of CSI, especially detailed information about the channel such as channel matrix H or covariance matrix of the channel, wherein the channel may be one between a UE and its serving access node(s) or one between a UE and its interfering access node(s) (which generally requires information exchanges among access nodes, such as channel information about an interfering link or RS information so that the UE or access node can estimate the interfering link). An iterative form of BIT consists of forward training (e.g., in a downlink direction) and backward training (e.g., in an uplink direction) that is repeated until convergence is achieved. A one-shot BIT comprises a single forward training step and a single backward training step. BIT is capable of adapting to unknown interference and can suppress interference without any channel estimation or CSI feedback, thereby making BIT less sensitive to the orthogonality of training sequences. A more detailed discussion of BIT is presented in co-assigned patent application entitled "System and Method for Communications System Training," application Ser. No. 15/983,692, filed May 18, 2018, which is hereby incorporated herein by reference in its entirety.

Uplink probing involves the estimation of uplink channels between the access node and UEs served by the access node after reception of the uplink SRS, which reflects the interference situation at neighboring cells.

FIG. 3 illustrates a flow diagram of operations 300 occurring in an interference probing process. Operations 300 may be indicative of operations occurring in an interference probing process involving an access node and one or more UEs.

Operations 300 begin with the one or more UEs transmitting uplink SRSs (block 305). The uplink SRSs may be transmitted by active UEs that are configured by the access node, and may be used for uplink channel estimation of the uplink channels between the configured UEs and the access node. In addition to being used for uplink channel estimation, the uplink SRSs may be used by the access node to select UEs for prescheduling. As discussed previously, prescheduled UEs are UEs selected by the access node, from of its configured UEs, to transmit trigger based uplink SRSs, which are used by the access node to determine downlink precoders. In an embodiment, the uplink SRSs transmitted by the UEs in block 305 may be unprecoded. In an embodiment, instead of the uplink SRSs, feedback transmitted by the UEs is used by the access node to select UEs for prescheduling. The access node performs uplink channel estimation (block 307). The estimation of the uplink channels is performed using the uplink SRSs transmitted by the UEs, for example. Alternatively, the estimation of the uplink channels is performed using the feedback transmitted by the UEs.

The access node preschedules the UEs (block 309). The access node may preschedule UEs based on the uplink SRSs or feedback received from the UEs. As an example, the access node selects the UEs associated with the uplink SRS (or feedback) received with highest signal quality measure. Examples of signal quality measures include SINR, SNR, RSRP, RSRQ, received signal power, and so on. The access node may select the UEs associated with uplink SRSs received with signal quality measures that exceed a specified threshold. The specified threshold may be specified in a technical standard, an operator of the communication system, or through collaboration between the access node and the UEs, for example. The access node may select a specified number of UEs associated with uplink reference signals received with signal quality measures that exceed a specified threshold. The specified number may be specified in a technical standard, an operator of the communication system, or through collaboration between the access node and the UEs, for example. As an example, the access node may preschedule UEs based on the channel quality indicator (CQI) of the uplink channels, or the precoding matrix indicator (PMI) associated with the UEs. The access node transmits downlink control information, e.g., in a DCI, intended for the prescheduled UEs to trigger SRS transmission with specific parameters and to assist UEs in the measurement (e.g., use) of the downlink ports. The downlink control information may provide to the prescheduled UEs the SRS parameters, as well as related downlink associations. In other words, the downlink control information configures the SRS parameters and the related downlink associations. The downlink control information may indicate to the prescheduled UEs which of the downlink CSI-RS are assigned to the prescheduled UEs for proper measurement and determination of downlink combiner and/or uplink precoder. In an embodiment, the DCI may be group based DCI addressing a group of UEs (e.g., all of active UEs or a subset of active UEs). In another embodiment, the DCI may be unicast DCI (such as 5G NR DCIs) addressed to a UE. The DCI (in either case) includes modified or added fields that signal the SRS parameters. The access node may transmit CSI-RSs (block 311). The CSI-RSs (if the access node is to transmit the CSI-RSs) may be transmitted in a precoded or unprecoded manner. The UEs may perform downlink channel estimation (block 313). In situations where the access node transmits the CSI-RSs, the UE performs downlink channel estimation in accordance with the received CSI-RSs. In an embodiment, only the UEs that received the downlink control signals (i.e., the prescheduled UEs) perform downlink channel estimation.

The prescheduled UEs transmit triggered uplink SRSs (block 315). The prescheduled UEs transmit the uplink SRSs as configured by the downlink control signals. In an embodiment, the uplink SRSs are precoded or are unprecoded (with no information contained therein). The uplink SRSs are transmitted in accordance with the SRS configuration. As an example, a prescheduled UE transmits its uplink SRS in configured SRS resources, over configured transmission ports, using configured subbands, combs, and cyclic shifts, and with configured transmission bandwidth, as configured by the downlink control signals.

The configuration of the SRS parameters such as the SRS resource sets (SRS resources within a set), SRS transmission bandwidth, SRS transmission ports, SRS transmission comb and cyclic shift, etc., may be performed using higher layer configuration. Arrangements of SRS resources or ports may be defined by the network and the network may configure the UEs with the different arrangements. In addition, the network may configure the UEs with a different mappings (e.g., relationships, associations) between downlink ports, layers, reference signals (such as DMRS, CSI-RS), and uplink port or layers (SRS).

In an embodiment, after reception of the uplink SRS, the access node preschedules UEs and indicates to the prescheduled UEs through signaling which portion of the SRS transmission bandwidth, which SRS resources or ports from the different SRS resources or ports arrangements, transmission comb, cyclic shift, and which of the downlink CSI-RS ports (and/or DMRS) are assigned to it. In addition to the listed parameters the indication signaled to the prescheduled UEs may include the association (e.g., mappings, relationships) between the uplink ports, the downlink ports, or bandwidth. The downlink ports may consist of the DMRS and/or CSI-RS ports. In an embodiment, the network uses a group DCI message to dynamically configure the SRS parameters. In another embodiment, a unicast DCI message is used to dynamically configure the SRS parameters. The SRSs transmitted by the prescheduled UEs may be referred to as triggered SRS to differentiate them from the uplink SRSs transmitted by the UEs to facilitate uplink channel estimation, such as in block 305 of FIG. 3. The uplink reference signals (e.g., the SRSs) are used to convey interference situation in the neighboring cells, as well as the serving access node's accounting of the interference suppression receiver capability of the UE. Subsequently, the access node determines the downlink precoder (in accordance with the received precoded SRSs (i.e., the triggered SRSs), for example) and transmits downlink data utilizing the downlink precoder.

The following will provide more details on the indication of the SRS transmission parameters As related to signaling the SRS Resources or Ports, the network indicates to the UEs which of the SRS resources or ports are assigned to the UEs. In other words, the UE needs to know which resource of the SRS resource pool or subset of the SRS configured resources to transmit on in the uplink.

In an embodiment, the network configures the UE with different arrangements of resources or ports. The different arrangements of the resources or ports may differ by the cyclic shift, transmission comb, number of symbols (e.g., orthogonal frequency division multiplexed (OFDM) symbols), etc., for example. The different arrangements represent different mechanisms the network may pack the UEs SRS resources or ports. In an embodiment, the different resources or ports arrangements are predefined. Signaling a predefined arrangement of resources or ports may require less overhead than signaling the different values for the cyclic shift, transmission comb, number of symbols (e.g., OFDM symbols), etc. As an example, if there are 8 predefined arrangements, signaling any one of the 8 may be accomplished by signaling a 3-bit index, while signaling the different values may require significantly more than 3 bits. The predefined arrangements may be defined in the 3GPP standard and/or higher layer configured, the network may downsize (further select and signal) a particular configuration after prescheduling (or scheduling) and may signal the downsized arrangement to the UE using DCI.

As an illustrative example of SRS resource or port signaling, consider a communication system with 8 type 1 demodulation reference signal (DMRS) ports. In an embodiment 12 DMRS ports may be used as an illustrative example. With 8 uplink SRS resources (e.g., ports) for all UEs operating within a single cell and that 8 UEs are prescheduled. There is a need for the UEs to know which of the 8 uplink SRS resources to transmit on. Therefore, there is a need to signal, to the UEs, in an attempt to inform the UE which uplink SRS resource (or resources) to use, in an efficient way to minimize impact on overall communication system performance. Informing the UEs which uplink SRS resources to use may involve indicating which comb, symbol, cyclic shift, number of OFDM symbols, etc., to use. As discussed previously, in one embodiment the UEs may be configured with different arrangements of these SRS resources or ports. These arrangements may be specified in a technical standard, by an operator of the communication system, or determined through collaboration between communicating devices, for example. Example arrangements include:

1 physical resource with 8 ports for 8 UEs having cyclic shift 8 (for orthogonality between ports) and comb 2;

1 physical resources with 8 ports for 8 UEs having cyclic shift 8 and comb 4;

8 physical resources with 1 port for each of the 8 UE;

2 physical resources with 4 ports per resources using cyclic shift 4

In a first example embodiment, there is 1 physical resource with 8 ports for the 8 UEs served within the cell, with a cyclic shift of 8 (ensuring orthogonality of SRS transmission), a comb of 2, and repetition over a specified number of symbols (the specified number of symbols may be specified in a technical standard, by an operator of the communication system, or determined through collaboration between communicating devices, for example). In order to indicate to the UEs which one of the 8 resources to use, a 3-bit indication is sufficient.

In a second example embodiment, there is 1 physical resource with 8 ports for the 8 UEs operating within the cell, with a cyclic shift of 8, and a comb of 4. In order to indicate to the UEs which one of the 8 resources to use, a 3-bit indication is sufficient.

In a third example embodiment, there are 8 physical resources with 1 port per physical resource for each UE operating within the cell, with OFDM symbol multiplexing. In order to indicate to the UEs which one of the 8 resources to use, a 3-bit indication is sufficient.

In a fourth example embodiment, there are 2 physical resources with 4 ports per physical resource for each UE operating within the cell, with a cyclic shift of 4. In order to indicate to the UEs which one of the 8 resources to use, a 4-bit indication is sufficient if some UEs are allocated more than one port, e.g., a UE may be allocated 2 ports.

These different resources or ports arrangements may be predefined and the network may configure the UE with the different arrangement. The network may signal one or more of these arrangements using DCI for the subset of (prescheduled, scheduled, active) UEs.

The examples presented above are only examples of resource configuration and the actual configuration may not be limited to the aforementioned. In this case the network may use a certain number of bits (for example 3 to 4 bits) in DCI to indicate to the UE which of the arrangements of resources or ports (implicitly indicating the transmission layers, comb and cyclic shift) is assigned to it.

In one embodiment, the network may define a full set of SRS resources/ports and use an indication to indicate for subset. Such a design is similar to the DMRS port indication in 5G NR. In another embodiment, the network may define the subset of SRS resources/ports and use indication to indicate the subset from the configured subsets. In any of these embodiments, a table may be used to summarize all the possible resources set/subsets with the ports (ranks) which may be tied to the cyclic shift, comb, OFDM symbols, offset.

The network may define DCI bit indication that may have a one to one mapping to port indication of the SRS which may be tied to the cyclic shift, comb, offset, OFDM symbols. The value indicated in the DCI would map to the ports that may be used for SRS transmission. In one embodiment, one port may be used such as port 0. In another embodiment, multiple ports may be used and such as for example two ports may be used for SRS transmission. The field may be referred to as antenna ports and number of layers for SRS and a fixed number of bits may be used in the DCI to indicate it.

In another embodiment, the access node may transmit configuration information of a plurality of SRS resources to a user equipment (UE). The configuration information includes a plurality of SRS resource sets to the UE, each SRS resource set comprising one or more SRS resources. The access node then transmits to the UE, an indication of one of the plurality of SRS resource set.

The antenna ports to be used for SRS transmission shall be determined according to the ordering of the SRS ports given by the predefined configuration which may be represented by tables. The number of bits which are indicated in the DCI as defined by the groups indicates the ports of transmission which are tied to physical resources such as cyclic shift, comb, OFDM symbols.

In the situation where a group DCI is used to convey the SRS configuration, the indication of the layers or ports for a UE within the pre-defined SRS port resources is possible. As an example for each cell (e.g., sector, transmission point, etc.), a predefined number of SRS port resources is assigned, such as, 8 or 12 ports, for example. In the group DCI, the network indicates the layers or ports for a UE within the predefined SRS port resources. For example the network has configured a SRS resource for all active UEs in the cell and the SRS resource has the same 8 ports. The group DCI indicates which of the 8 ports are allocated for the UE.

In an example, consider a communication system with 4 UEs, the network may assign the first port for a first UE, two subsequent ports for the second UE, etc. In another embodiment, the network may reuse DMRS port mapping or CSI-RS port mapping.

In one embodiment, the SRS resource is configured for all resource block groups (RBGs) but the scheduling or group DCI allows different UEs be scheduled on different RBGs.

As related to UE identifiers, the UE identifiers are used to reduce DCI signaling overhead. In an embodiment, to further reduce DCI size, unique but short UE identifiers are assigned to the prescheduled UEs. Instead of using long UE identifiers, such as a radio network temporary identifier (RNTI), which may be 10 or more bits long, short UE identifiers that are unique within the prescheduled UEs are assigned to each prescheduled UE. As an example, if there is a maximum of 16 prescheduled UEs, then the short UE identifier may be as short as 4 bits, while if there is a maximum of 8 prescheduled UEs, then the short UE identifier may be as short as 3 bits. In an embodiment, the short UE identifier may be allocated by the access node and signaled to the prescheduled UEs using RRC messaging, MAC CE messaging, higher layer messaging, and so on.

As related to indicating UE identifiers, the access node may send a DCI trigger to the prescheduled UEs. The indication of the prescheduled UEs may be included in a dedicated field of the DCI. Additionally, the UE identifiers and the UE identifier field in the DCI may be configured using higher layer signaling.

With the use of UE identifiers, prescheduled UEs are able to decode the DCI that is identified the UE ID. Those prescheduled UEs that are able to decode the DCI identified with their UE IDs are considered to be the triggered UEs. UEs which are configured but not triggered may also attempt to decode the DCI, but they would fail because the DCI is not addressed to them, and hence they are not triggered.

As new UEs are prescheduled or additional set of active UEs are present, the UE identifiers may be renewed and reconfigured, possibly through higher layer configuration, for example.

As discussed previously, there may be an association between the SRS and the DL Reference Signals. In order for a UE to receive precoded (or unprecoded) CSI-RS, the UE needs to know which CSI-RS ports have been allocated, therefore, a CSI-RS port indication needs to be sent to the UE. After the UE receives the CSI-RS port indication, the UE may be able to infer (from the CSI-RS port indication, for example) the preconfigured CSI-RS ports to use to measure the downlink channel and the SRS ports to transmit the SRS because the SRS resource and CSI-RS resource are already preconfigured and there is an association between the SRS and the CSI-RS resources.

Similarly, a UE needs to know which of DMRS ports have been allocated for it. A DMRS port indication needs to be sent to the UE. After the UE receives the DMRS port indication, the UE may be able to infer (from the DMRS port indication, for example) the preconfigured DMRS ports to use to measure the downlink channel and the SRS ports to transmit the SRS because the SRS resource and DMRS resource are already preconfigured and there is an association between the SRS and DMRS resources.

In one embodiment, the SRS indication field which is used to signal the specific arrangement of SRS resources or ports are also used to indicate to the UE a mapping between the uplink and downlink ports (such as DMRS or CSI-RS ports). Because the SRS ports of each UE are identified, the UE may infer the associated ports in the downlink from the configuration (the mapping). In such a case, the associated relationship between the uplink and downlink ports may be configured through higher layer configuration. A fixed mapping may be defined that can identify the association, for example, a one to one mapping between the uplink and downlink ports may be configured. In another embodiment, a permutation between the uplink and downlink ports may be applied as a mapping. The permutation may be specified in a technical standard, by an operator of the communication system, or through collaboration between the network and the UE. Hence, the permutation is known by both the network and the UE. As the UE determines the SRS ports or layers indicated to the UE, the UE may measure the corresponding CSI-RS and/or DMRS for channel estimation and use the measurement to determine the precoder for precoding of the uplink SRS.

In one embodiment, the indication may be implicit. In this case, signaling the SRS resources or ports may be sufficient to signal the association due to the fixed mapping between the resources. In another embodiment, the indication may be explicit. In this case, a dedicated field that explicitly identifies the downlink CSI-RS, or DMRS for the scheduled UEs may be used.

DCI may have dedicated field to indicate the DMRS-SRS association. It may also have field to indicate the CSI-RS-DMRS association. A table may be defined in the specification that has a one to one mapping of the Uplink port with the downlink ports.

The number of bits used to indicate the association between the downlink port(s) and SRS port(s) may be used for indication of the transmission of one of more downlink ports and the SRS ports which may be indicated by the SRS resources/ports indication fields.

In an embodiment the association is used to indicate not only the port association but also the bandwidth association (active bandwidth part)

In addition to the above mentioned parameters (e.g., UE identifier, an association, and the SRS resources indication), the Group DCI may include some or all of the following:

A resource allocation field which indicates the time and frequency resources (resource block groups for UEs, for example), An explicit indication of CSI-RS or DMRS ports using dedicated fields in the DCI that may signal the downlink ports. This may also be used by the UE to determine the rank of the transmission. In an embodiment, the UE may infer the rank of transmission in the uplink based on the downlink reception.

A transmit power command used for SRS transmission power control.

Figures 4, 5:
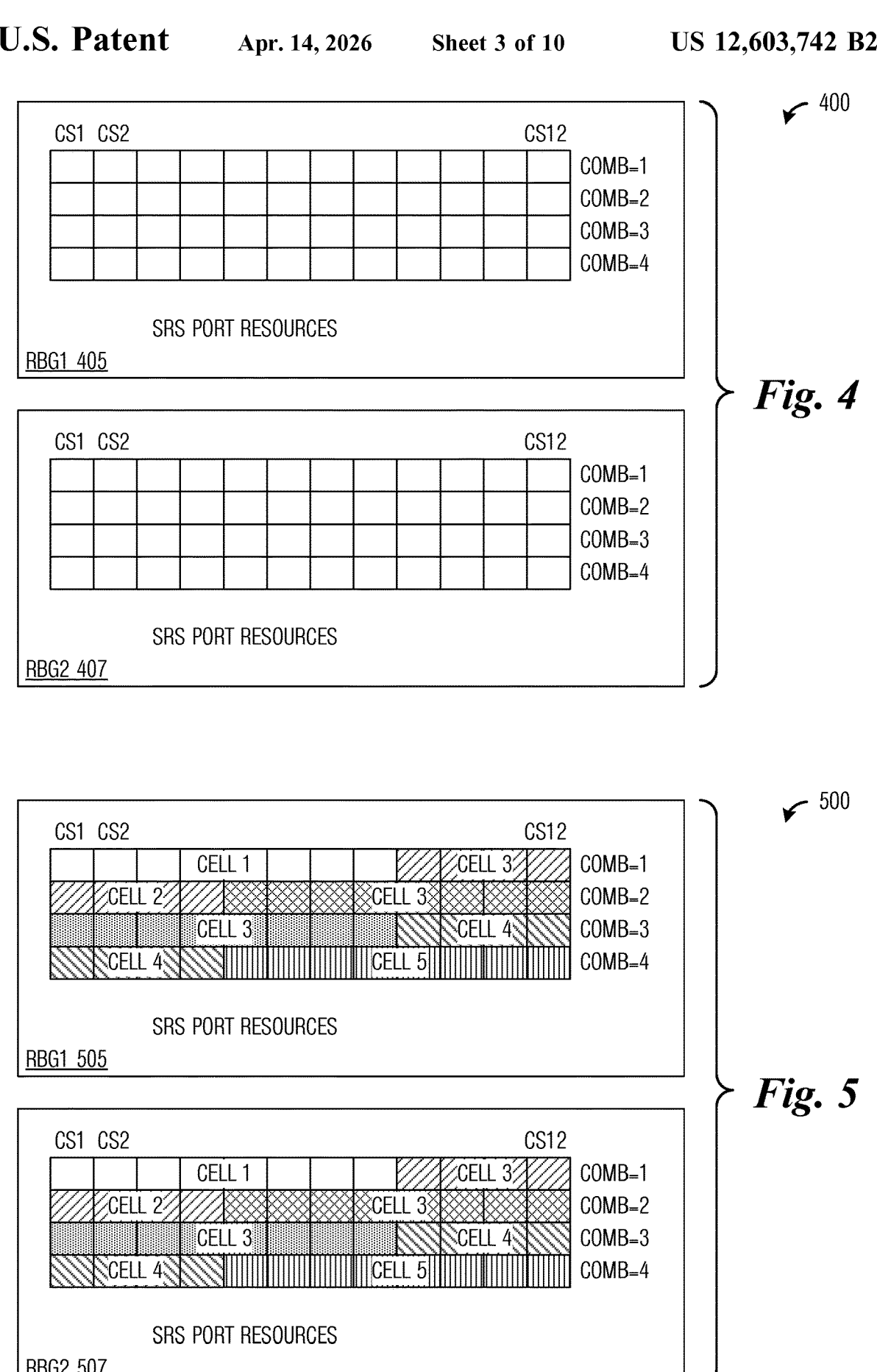
FIGS. 4 and 5 illustrate resource block groups (RBGs) and example mapping of SRS resources and ports according to example embodiments presented herein.

FIGS. 4 and 5 illustrate diagrams 400 and 500 of RGBs 405, 407, 505, and 507, and example mapping of SRS resources and ports. Diagram 400 illustrates RGBs 405 and 407 in a communication system with the following configuration: assume DMRS type 1 (8 ports per RGB per cell for all paired UEs); in another embodiment 12 port DMRS may be considered, and the 8 ports are associated with 8 SRS port resources, selected from n available port resources (e.g., for comb 4, n=48, and for comb 2, n=16). The SRS from neighboring cells should be multiplexed on the n SRS port resources. In order to indicate, to a UE, which 1, 2, or 4 SRS port resources out of the available n SRS port resources would require more bits than available in a DCI message.

Diagram 500 illustrates RGBs 505 and 507, with the same configuration as discussed in FIG. 4. In an embodiment, UE-group CSI-RS or DMRS design is applied to the SRS. For each cell, there are only 8 predefined SRS port resources (shown in FIG. 5 as different shaded and pattern blocks in the SRS port resources region of the RGBs). Then, in a DCI message (such as a group DCI message), the layer or port assignments for a UE are made within the 8 predefined SRS port resources and indicated accordingly. As an example configure a SRS resource for all active UEs in cell 1 (shown as unshaded blocks in the SRS port resources region of the RGBs), and the SRS resource has the same 8 ports. The group DCI message indicates which of the 8 ports are allocated to a particular UE. As an example, rank [1, 2, 4, 1] are signaled for UEs 1, 2, 3, and 4, without needing to indicate the layer index. As another example, the DMRS port mapping of the resources are used. The SRS resource is configured for all RGBs, but the scheduling or group DCI allows different UEs to be scheduled on different RGBs.

Alternative designs to the Group DCI for signaling control information of the SRS are possible. In one embodiment, the UEs identified in a Group DCI share a resource allocation field (Type 0 or Type 1 indication). Such a case may occur in a multi-user multiple input multiple output (MU-MIMO) setting, where UEs may share resource blocks or RBGs. In this situation, preconfigured UEs which are not prescheduled have fields in the Group DCI with trigger set to zero.

In another embodiment, the UEs identified in a Group DCI have separate fields for the indication of the resource allocation fields for each of the UEs. In this case, preconfigured UEs which are not prescheduled have fields with trigger set to zero.

In any of the preceding embodiment, a UE identifier may be used to identify prescheduled UEs. In this way, only prescheduled UE are able to decode the DCI. However, a UE will attempt to decode the DCI to check if it is triggered (prescheduled) or not. For example, all UEs detecting the DCI can attempt to decode the DCI.

In any of the preceding embodiments, the DCI includes a combination of fields listed or subset of the fields aforementioned.

In another embodiment, a modified DCI format, such as DCI format 0_1 (UL Grant) or DCI format 1_1, may be used to dynamically configure triggered (prescheduled UEs) with the SRS parameters aforementioned and the associated downlink PDSCH and/or CSI-RS parameters.

Any of the 5G NR DCI designs may be used to signal the necessary aforementioned such as the necessary fields are added/modified to the DCI.

Figure 6:
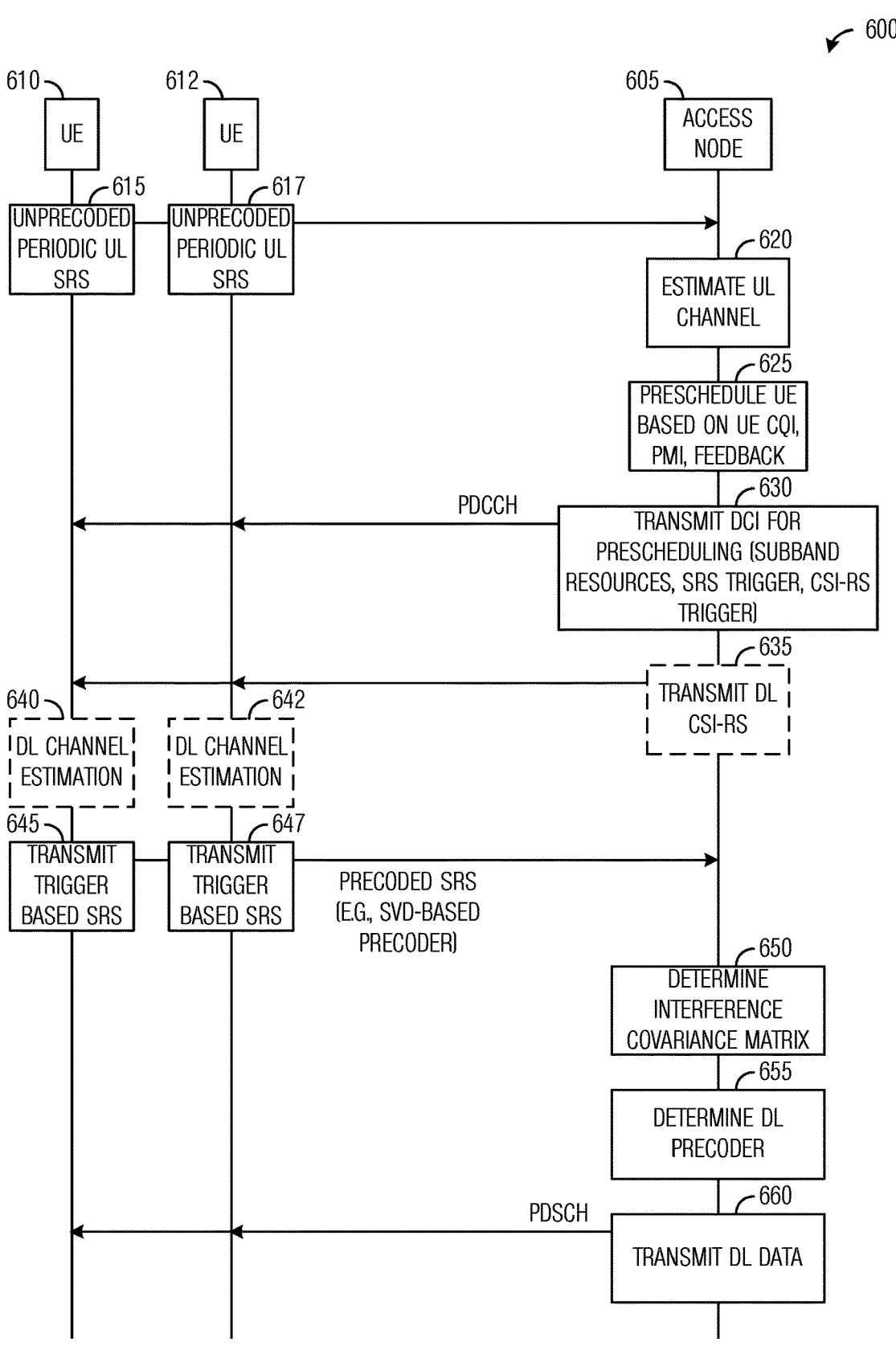
FIG. 6 illustrates a diagram of messages exchanged by communicating devices performing interference probing according to example embodiments presented herein.

FIG. 6 illustrates a diagram 600 of messages exchanged by communicating devices performing interference probing. Diagram 600 displays messages exchanged by an access node 605 and UEs 610 and 612 as the communicating devices perform interference probing (may also be referred to as training or BIT).

UEs 610 and 612 transmit uplink SRSs (blocks 615 and 617). The uplink SRSs may be unprecoded and periodic. The uplink SRSs are transmitted to access node 605. Access node 605 estimates the uplink channels (block 620). The estimation of the uplink channels is made in accordance with the uplink SRSs transmitted by the UEs. Access node prescheduls UEs (block 625). The prescheduling of the UEs may be in accordance with the signal quality measures, CQI, PMI, or feedback, as discussed previously. In the example shown in FIG. 6, UEs 610 and 612 are also the prescheduled UEs.

Access node 605 transmits control information configuring uplink SRSs for the prescheduled UEs (block 630). The control information may be transmitted in group DCI or unicast DCI, for example. The group DCI may contain the UE identifiers of the prescheduled UEs in one embodiment. The control information may include (a subset thereof is also possible) configuration information, for UEs, such as, transmission bandwidth of the uplink SRS, or a portion of the transmission bandwidth, an indication of the transmission ports of the uplink SRS, an indication of the SRS resources or ports of the uplink SRS, an implicit or explicit indication of the cyclic shift and comb, the subbands of the uplink SRS, SRS trigger, CSI-RS trigger, DMRS trigger, a mapping between the CSI-RS and SRS, an indication of the mapping between the DMRS and SRS, etc.

If access node 605 is to transmit CSI-RS, access node 605 transmits the CSI-RS (block 635). UEs 610 and 612 may perform downlink channel estimation (blocks 640 and 642). The downlink channel estimation may be performed in accordance with the CSI-RS transmitted by access node 605.

UEs 610 and 612 transmit uplink SRS (blocks 645 and 647). The uplink SRS are transmitted in accordance with the configuration information transmitted by access node 605. The uplink SRS may be precoded, e.g., single value decomposition (SVD) based precoder. Access node 605 determines interference covariance matrices (block 650). The interference covariance matrices are determined based on the uplink SRS transmitted by UEs 610 and 612 (i.e., the prescheduled UEs). Access node 605 determines downlink precoders (block 655). The downlink precoders are determined in accordance with the interference covariance matrices. Access node 605 transmits downlink data to UEs 610 and 612 (block 660). Access node 605 precodes the downlink data for each prescheduled UE using the downlink precoder associated with the prescheduled UE, for example. The precoded downlink data is transmitted over a physical downlink shared channel (PDSCH).

In the Third Generation Partnership Project (3GPP) Fifth Generation (5G) New Radio (NR) standards related to existing DCI formats, the DCI size is minimized in order to reduce communications overhead. As an example, in the DCI format 2_3, used for transmitting group transmit power control (TPC) commands for SRS transmissions by one or more UEs, the DCI size is less than or equal to the DCI size of DCI format 1_0. Therefore, the number of bits available to transmit the uplink SRS configurations is limited. However, existing DCI formats do not support dynamic signaling of SRS configuration. Additionally, control information has to be provided for all configured UEs, even those that are not triggered (i.e., not prescheduled) to transmit the uplink SRS, therefore, the number of UEs configured using the existing DCI formats is limited due to the limitation of the number of bits.

According to an example embodiment, a DCI format for conveying SRS configuration information is provided. In an embodiment, the DCI includes SRS configuration information only for the prescheduled UEs. Existing DCI formats includes control information for all configured UEs, even those that are not prescheduled. Having the DCI only including SRS configuration information for the prescheduled UEs reduces the size of the DCI, thereby permitting a reduction in the DCI size or an inclusion of more SRS configuration information.

Figures 7, 8:
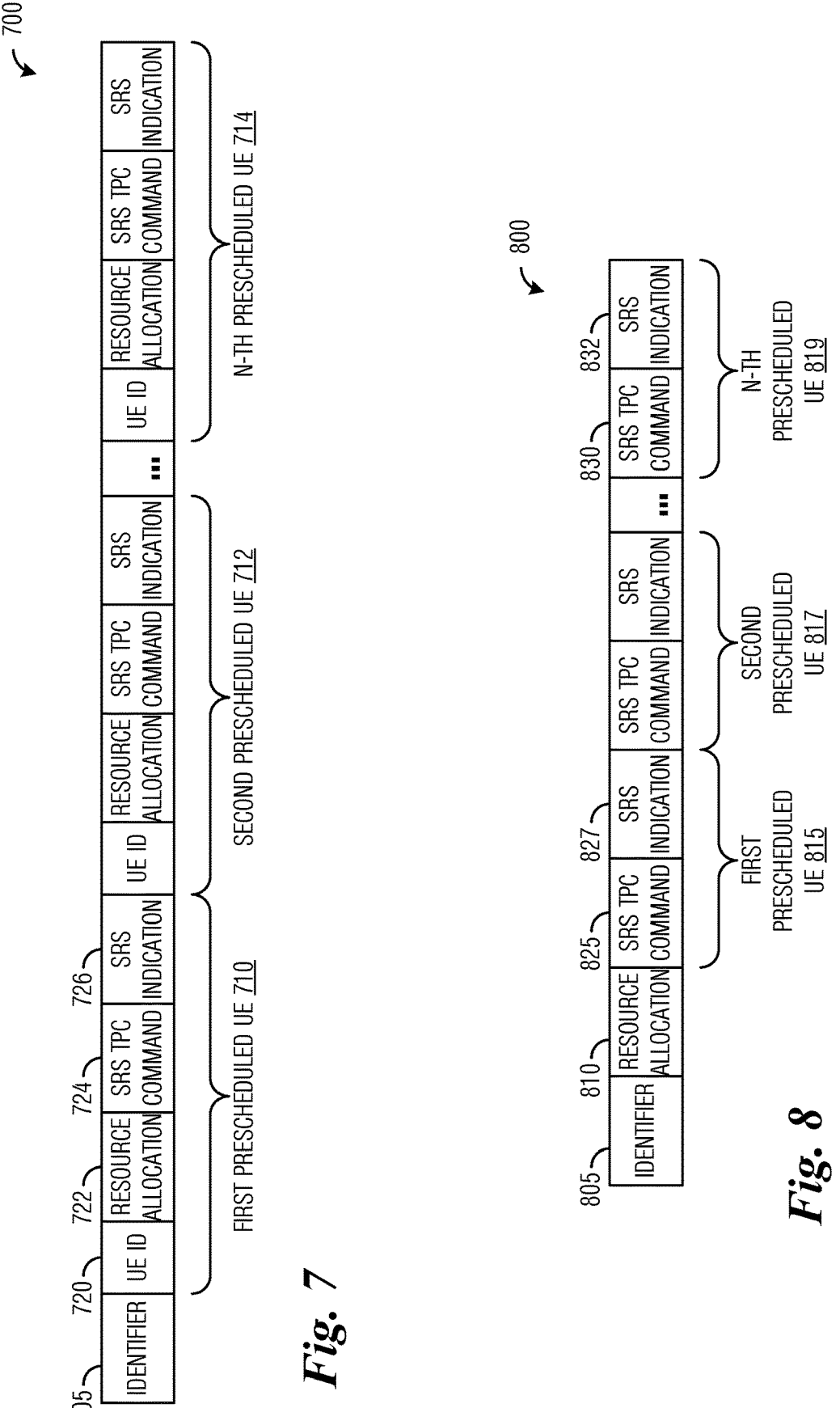
FIG. 7 illustrates a first example DCI according to example embodiments presented herein.
FIG. 8 illustrates a second example DCI according to example embodiments presented herein.

FIG. 7 illustrates a first example DCI 700. DCI 700, as shown in FIG. 7, is an example of a DCI where the DCI includes SRS configuration information for only prescheduled UEs and a short UE identifier is used to identify the UEs. DCI 700 includes an identifier field 705, which identifies the DCI being a DCI for conveying SRS configuration information to prescheduled UEs. DCI 700 also includes SRS configuration information for each of the prescheduled UEs, such as first prescheduled UE 710, second prescheduled UE 712, and N-th prescheduled UE 714.

As an example of the savings achievable by using the short UE identifiers and conveying information only for the prescheduled UEs, consider a situation where an access node is serving 20 UEs, with only 5 prescheduled UEs. If 10 bit long RNTIs are used, the DCI format would need to convey at least 20*10=200 bits of identifying information alone, while using the short UE identifiers and prescheduled UEs, DCI format 700 would need to convey only 5*4=20 bits of identifying information.

For each prescheduled UE, such as first prescheduled UE 710, DCI 700 includes a UE ID field 720, a resource allocation field 722, a SRS TPC command field 724, and a SRS indication field 726. UE ID field 720 comprising the short UE identifier of the prescheduled UE, and may be 4 bits in size, for example. Resource allocation field 722 comprising time and frequency resource blocks or groups for the prescheduled UE. The size of resource allocation field 722 may depend upon the type of the resource allocation, as well as the bandwidth part (BWP) size, with the size also being dependent on the Resource allocation type, for example. SRS TPC command field 724 comprising a power control command for the SRS, and may be 2 bits in size, for example. SRS indication field 726 comprising SRS resources, SRS ports, SRS transmission bandwidth, etc. The value in SRS indication field 726 may be preconfigured with a set of different possible arrangements of SRS resources or ports, SRS transmission bandwidth, etc., values and only an index to a particular set of possible SRS resources, SRS ports, SRS transmission bandwidth, etc., is held in SRS indication field 726 to reduce size. SRS indication field 726 may also be used to indicate the mapping with the DL ports (layers, reference signals, etc.). An example SRS indication field 726 size is 4 bits. SRS indication field 726 supports SRS port indication in the uplink to transmit the SRS. Also implicitly indicated is the SRS cyclic shift, SRS subband, SRS comb, etc. Also implicitly indicated is the precoded CSI-RS port(s) assigned to the prescheduled UE in the downlink (e.g., the same ports). The example sizes of the various fields of DCI 700 are for discussion purposes only. The example embodiments presented herein are operable with other field sizes.

As related to resource allocation fields, such as resource allocation field 722, Resource Type 1 may be used for frequency allocation. Alternatively, Resource Type 2 may be used for frequency allocation. Resource block groups may be used for UEs. Additionally, the frequency allocation may include the allocation for the SRS transmission.

As related to downlink antenna ports, an indication for the UE may be used for downlink ports or downlink layers. As an example, the indication may be a bitmap. As another example, the indication may be a value. A UE may be able to determine CSI-RS or DMRS ports to use in accordance with the SRS ports allocated to the UE. As an example, the indication may use the SRS indication field. In another embodiment, the indication of the SRS ports may use a bitmap.

Information associated with configured UEs that are not prescheduled are not be included in DCI format 700. A prescheduled UE may process the DCI to determine if the access node has triggered the prescheduled UE for SRS transmission.

In an embodiment, to further reduce DCI size, the SRS configuration information for each prescheduled UE is arranged in order (e.g., increasing or decreasing order) so that it is not necessary to include the short UE identifier in the DCI. Therefore, additional reduction in the DCI size is achieved.

In an embodiment, time and frequency resource blocks or groups are configured for the prescheduled UEs. In FIG. 7, each prescheduled UE may be configured with a different allocation of time and frequency resource blocks or groups. In this embodiment, a single allocation of time and frequency resource blocks or groups is configured for the prescheduled UEs indicated in the DCI. In an embodiment, a single DCI is used to convey SRS configuration information for the prescheduled UEs of the access node. In such a situation, the DCI includes SRS TPC command and SRS indication for each prescheduled UE. The SRS TPC command and SRS indication for each prescheduled UE may be arranged in accordance with the short UE identifier assigned to each prescheduled UE. The SRS TPC command and SRS indication for each prescheduled UE may be arranged in increasing short UE identifier or decreasing short UE identifier, for example.

In an embodiment, a single DCI is used to convey SRS configuration information for a subset of the prescheduled UEs of the access node. In such a situation, the DCI includes SRS TPC command and SRS indication for each prescheduled UE in the subset. As an example, a first DCI includes SRS TPC commands and SRS indications for a first subset of the prescheduled UEs, a second DCI includes SRS TPC commands and SRS indications for a second subset of the prescheduled UEs, and so on. The SRS TPC command and SRS indication for each prescheduled UE in a subset may be arranged in accordance with the short UE identifier assigned to each prescheduled UE in the subset. The SRS TPC command and SRS indication for each prescheduled UE in the subset may be arranged in increasing short UE identifier or decreasing short UE identifier, for example.

FIG. 8 illustrates a second example DCI 800. DCI 800, as shown in FIG. 8, is an example of a DCI where there is a single allocation of time and frequency resource blocks or groups is configured for the prescheduled UEs. DCI 800 includes an identifier field 805, which identifies the DCI being a DCI for conveying SRS configuration information to prescheduled UEs, and a resource allocation field 810. Resource allocation field 810 comprising time and frequency resource blocks or groups for the prescheduled UEs indicated in DCI 800. DCI 800 also includes SRS TPC commands and SRS indications for each of the prescheduled UEs, such as first prescheduled UE 815, second prescheduled UE 817, and N-th prescheduled UE 819.

For each prescheduled UE, such as first prescheduled UE 815, DCI 800 includes a SRS TPC command field 825, and a SRS indication field 827. SRS TPC command field 825 comprising a power control command for the SRS, and may be 2 bits in size, for example. SRS indication field 827 comprising SRS resources, SRS ports, SRS transmission bandwidth, etc. The value in SRS indication field 827 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 827 to reduce size. An example SRS indication field 827 size is 4 bits. SRS indication field 827 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc.

In an embodiment, to further reduce DCI size, allocations of time and frequency resource blocks or groups are configured for the prescheduled UEs. The allocation of time and frequency resource blocks or groups may be configured for the prescheduled UEs that are scheduled for SRS transmission. Hence, in such a situation, allocations of time and frequency resource blocks or groups are included for each prescheduled UE that is scheduled for SRS transmission and omitted for each prescheduled UE that is not scheduled for SRS transmission.

Figures 9, 10:
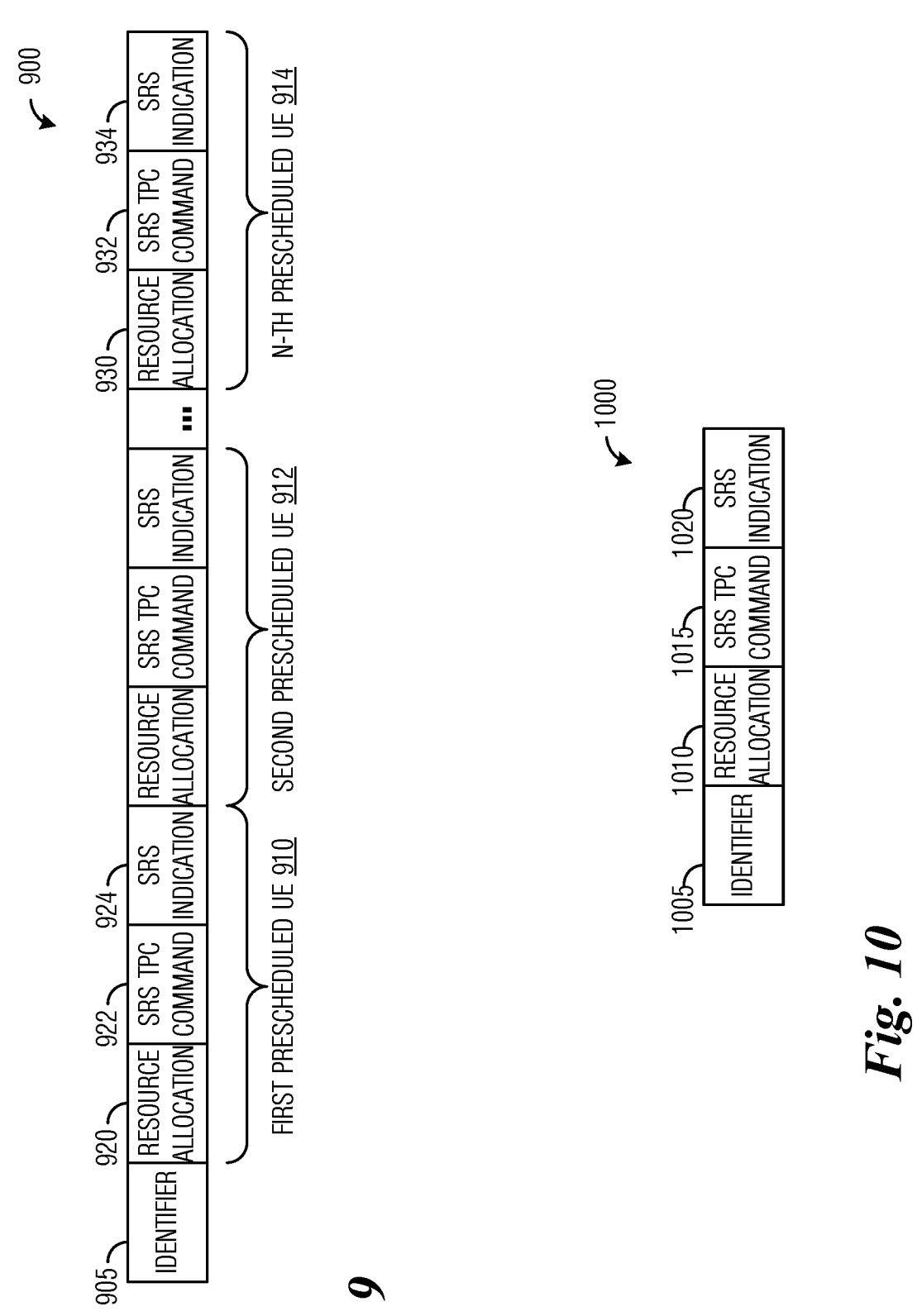
FIG. 9 illustrates a third example DCI according to example embodiments presented herein.
FIG. 10 illustrates a fourth example DCI according to example embodiments presented herein.

FIG. 9 illustrates a third example DCI goo. DCI goo, as shown in FIG. 9, is an example of a DCI where there are allocations of time and frequency resource blocks or groups for each prescheduled UE that is scheduled for SRS transmission. DCI goo includes an identifier field 905, which identifies the DCI being a DCI for conveying SRS configuration information to prescheduled UEs. DCI goo also includes information for each prescheduled UE, such as first prescheduled UE 910, second prescheduled UE 912, and N-th prescheduled UE 914. The information may differ depending on the prescheduled UE, e.g., prescheduled UEs that are scheduled for SRS transmission versus prescheduled UEs that are not scheduled for SRS transmission.

For each prescheduled UE that is scheduled for SRS transmission, such as first prescheduled UE 910, DCI goo includes a resource allocation field 920, a SRS TPC command field 922, and a SRS indication field 924. Resource allocation field 920 comprising time and frequency resource blocks or groups for the prescheduled UE. The size of resource allocation field 920 may depend upon the type of the resource allocation, as well as the BWP size, and may be 10 bits in size, for example. SRS TPC command field 922 comprising a power control command for the SRS, and may be 2 bits in size, for example. SRS indication field 924 comprising SRS resources, SRS ports, SRS transmission bandwidth, etc. The value in SRS indication field 924 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 924 to reduce size. An example SRS indication field 924 size is 4 bits. SRS indication field 924 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc. The example sizes of the various fields of DCI 900 are for discussion purposes only. The example embodiments presented herein are operable with other field sizes.

For each prescheduled UE that is not scheduled for SRS transmission, such as N-th prescheduled UE 914, resource allocation field 930, SRS TPC command field 932, and SRS indication field 934 are set to zero or some other specified value. Although FIG. 9 illustrates an example where N-th prescheduled UE 914 is a prescheduled UE that is not scheduled for SRS transmission, any of the N prescheduled UE in DCI goo may be a prescheduled UE that is not scheduled for SRS transmission.

The example embodiments illustrated in FIGS. 7-9 are for group DCI. However, the example embodiments presented herein are also operable for unicast DCI. In unicast DCI, the DCI is specifically addressed to a single UE. The addressing of the DCI to a particular UE may be accomplished by encoding the DCI with an identifier of the UE. When the DCI is encoded using the identifier of the UE, only the UE will be able to decode the DCI, while other UEs will detect the encoded DCI as noise. Because the DCI is specifically addressed to the UE using its identifier, the DCI does not need to include a unique identifier of the UE. Thereby, the size of the DCI is reduced.

FIG. 10 illustrates a fourth example DCI 100. DCI 100, as shown in FIG. 10, is an example of a DCI used in unicast DCI. DCI 1000 includes an identifier field 1005, a resource allocation field 1010, a SRS TPC command field 1015, and a SRS indication field 1020. Identifier field 1005 identifies the DCI being a DCI for conveying SRS configuration information to prescheduled UEs. Resource allocation field 1010 comprising time and frequency resource blocks or groups for the prescheduled UE. The size of resource allocation field 1010 may depend upon the type of the resource allocation, as well as the BWP size, and may be 10 bits in size, for example. SRS TPC command field 1015 comprising a power control command for the SRS, and may be 2 bits in size, for example. SRS indication field 1020 comprising SRS resources, SRS ports, SRS transmission bandwidth, etc. The value in SRS indication field 1020 may be preconfigured with a set of possible SRS resources, SRS ports, SRS transmission bandwidth, etc., values and only an index to a particular set of possible SRS resources, SRS ports, SRS transmission bandwidth, etc., is held in SRS indication field 1020 to reduce size. An example SRS indication field 1020 size is 4 bits. SRS indication field 1020 supports SRS port indication in the uplink to transmit the SRS. Also implicitly indicated is the precoded CSI-RS port(s) assigned to the prescheduled UE in the downlink (e.g., the same ports). Also implicitly indicated is the SRS cyclic shift, SRS subband, SRS comb, etc. The example sizes of the various fields of DCI 1000 are for discussion purposes only. The example embodiments presented herein are operable with other field sizes.

In another embodiment, dynamic signaling using a field (or fields) in the DCI may be used to signal an identifier of a reference downlink resource (or resources). A dedicated field to signal the mapping from a configured fixed mapping may be configured using higher layer signaling.

Figure 11:
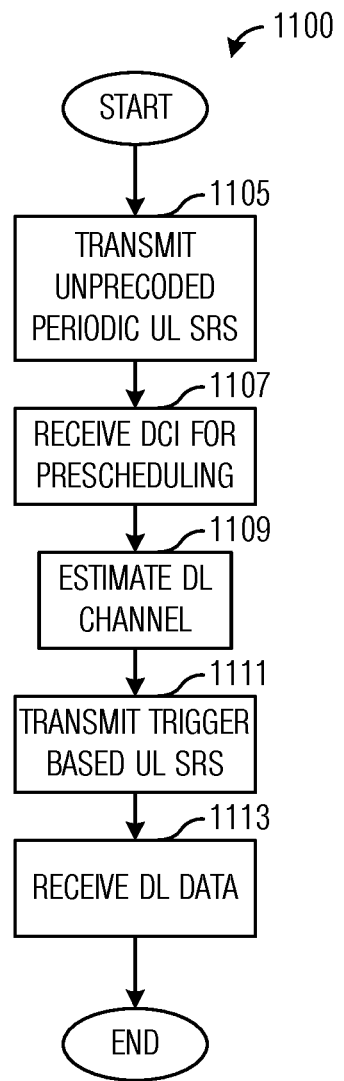
FIG. 11 illustrates a flow diagram of example operations occurring in a UE according to example embodiments presented herein.

FIG. 11 illustrates a flow diagram of example operations 1100 occurring in a UE. Operations 1100 may be indicative of operations occurring in a UE as the UE participates in interference probing and receives downlink data. The UE may be a prescheduled UE.

Operations 1100 begin with the UE transmitting an uplink SRS (block 1105). The uplink SRS may be unprecoded. The uplink SRS may be periodic in nature. The UE receives DCI from an access node (block 1107). The DCI may include SRS configuration information for the UE. The SRS configuration information configures the UE to make a SRS transmission. The DCI may also include CSI-RS configuration. The DCI may be part of a group DCI message. The DCI may be a unicast DCI message. The UE estimates the downlink channel (block 1109). The UE estimates the downlink channel using a CSI-RS transmitted by the access node. The UE transmits a precoded SRS (block 1111). The precoded SRS is transmitted in accordance with the SRS configuration information received in the DCI. The UE receives downlink data (block 1113). The downlink data is received from the access node. The downlink data is precoded using a precoder determined in accordance with the precoded SRS transmitted by the UE.

Figure 12:
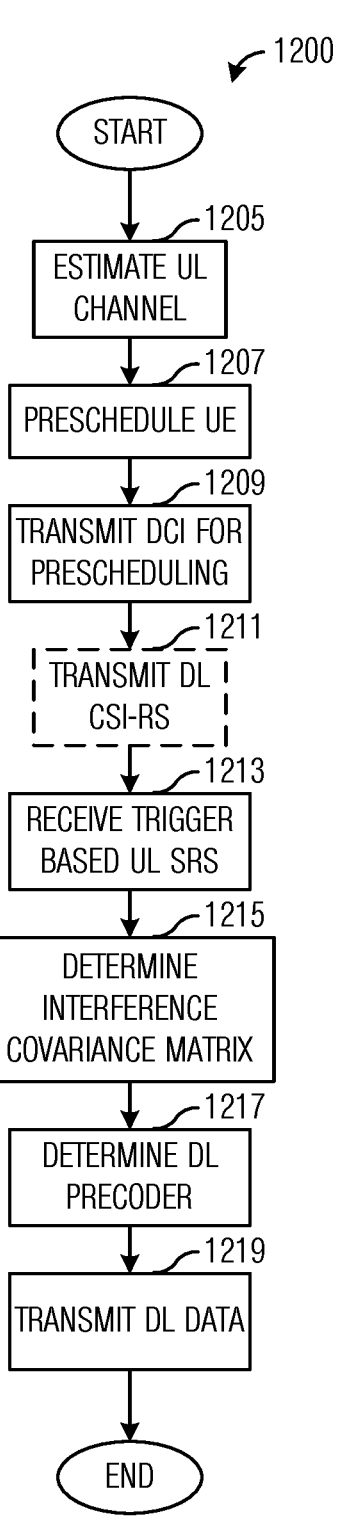
FIG. 12 illustrates a flow diagram of example operations occurring in an access node according to example embodiments presented herein.

FIG. 12 illustrates a flow diagram of example operations 1200 occurring in an access node. Operations 1200 may be indicative of operations occurring in an access node as the access node participates in interference probing and transmits downlink data.

Operations 1200 begin with the access node estimating an uplink channel (block 1205). The access node estimates the uplink channel using a SRS transmitted by a UE, for example. The SRS may be precoded or unprecoded. The access node preschedules UEs (block 1207). The access node preschedules UEs in accordance with the SRSs transmitted by UEs. As an example, the access node preschedules UEs associated with SRSs with signal quality exceeding a specified threshold. The access node transmits DCI to the prescheduled UEs to trigger SRS transmission (block 1209). The DCI transmitted by the access node may also cause the UE to measure downlink CSI-RS or DMRS. The access node configures SRSs for the prescheduled UEs and sends SRS configuration information to the prescheduled UEs in the DCI. The SRS configuration information may also include CSI-RS information. The DCI may be a group DCI or unicast DCIs.

The access node may transmit a CSI-RS (block 1211). The CSI-RS may be used for downlink channel estimation. The access node receives a precoded SRS (block 1213). The precoded SRS may be received in accordance with the SRS configuration information. The access node determines an interference covariance matrix (block 1215). The interference covariance matrix is determined in accordance with the precoded SRS. The access node determines a downlink precoder (block 1217). The downlink precoder is determined in accordance with the interference covariance matrix. The access node transmits downlink data (block 1219). The downlink data is precoded in accordance with the downlink precoder.

Figures 13, 14:
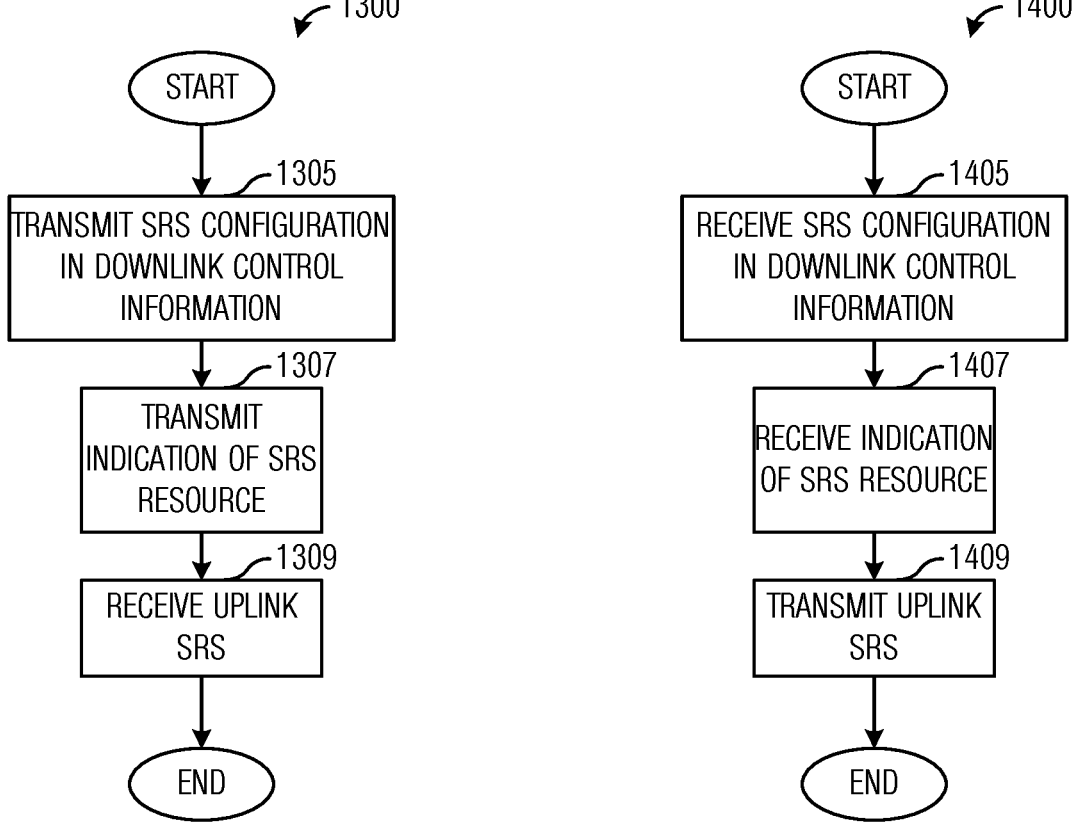
FIG. 13 illustrates a flow diagram of example operations occurring in an access node configuring uplink SRSs according to example embodiments presented herein.
FIG. 14 illustrates a flow diagram of example operations occurring in a UE transmitting uplink SRSs according to example embodiments presented herein.

FIG. 13 illustrates a flow diagram of example operations 1300 occurring in an access node configuring uplink SRSs. Operations 1300 may be indicative of operations occurring in an access node as the access node configures uplink SRSs and receives an uplink SRS transmission.

Operations 1300 begin with the access node transmitting a SRS configuration (block 1305). The SRS configuration may be transmitted in downlink control information, e.g., in a group DCI or a unicast DCI. In the situation when the group DCI is used, the group DCI may be addressed to UEs (e.g., prescheduled UEs) using UE identifiers, which are unique within the group of UEs, but are shorter than typical UE identifiers, so save signaling overhead. In an embodiment, the SRS configuration includes information regarding arrangements of SRS port resources (e.g., combs, offsets, cyclic shifts, symbols, etc.) The SRS port resources may also be grouped into plurality of resource groups. In an embodiment, the SRS configuration includes sets of SRS ports of SRS resources. In an embodiment, the SRS configuration includes information regarding associations between SRS port resources and downlink port resources (such as CSI-RS ports, DMRS ports, etc.). Also included may be information about mappings between the ports.

The access node transmits an indication of SRS resources (block 1305). In an embodiment, the indication of the SRS resources indicates a SRS resource group to use for uplink SRS transmission. In an embodiment, the indication of the SRS resources indicates a subset of the SRS ports of the SRS resource to use for uplink SRS transmission. In an embodiment, the indication of the SRS resources indicates an association to use to determine the SRS ports to use for uplink SRS transmission. The indication of the SRS resources may be transmitted in downlink control information, e.g., in a group DCI or a unicast DCI. When the group DCI is used, the UE identifiers (as described above) are used. The indication of the SRS resources may be included in a message transmitted after the transmission of the SRS configuration. The message including the indication of the SRS resources may be the first message transmitted after the transmission of the SRS configuration. The access node receives uplink SRS (block 1309). The uplink SRS is received in accordance with the SRS resources as indicated.

FIG. 14 illustrates a flow diagram of example operations 1400 occurring in a UE transmitting uplink SRSs. Operations 1400 may be indicative of operations occurring in a UE as the UE receives an uplink SRS configuration and transmits an uplink SRS.

Operations 1400 begin with the UE receiving a SRS configuration (block 1405). The SRS configuration may be received in downlink control information, e.g., in a group DCI or a unicast DCI. In the situation when the group DCI is used, the group DCI may be addressed to UEs (e.g., prescheduled UEs) using UE identifiers, which are unique within the group of UEs, but are shorter than typical UE identifiers, so save signaling overhead. In an embodiment, the SRS configuration includes information regarding arrangements of SRS port resources (e.g., combs, offsets, cyclic shifts, symbols, etc.) The SRS port resources may also be grouped into plurality of resource groups. In an embodiment, the SRS configuration includes sets of SRS ports of SRS resources. In an embodiment, the SRS configuration includes information regarding associations between SRS port resources and downlink port resources (such as CSI-RS ports, DMRS ports, etc.). Also included may be information about mappings between the ports. Even if the UE is not an intended recipient of the SRS configuration, the UE receives the downlink control information and attempts to decode the downlink control information.

The UE receives an indication of SRS resources (block 1407). In an embodiment, the indication of the SRS resources indicates a SRS resource group to use for uplink SRS transmission. In an embodiment, the indication of the SRS resources indicates a subset of the SRS ports of the SRS resource to use for uplink SRS transmission. In an embodiment, the indication of the SRS resources indicates an association to use to determine the SRS ports to use for uplink SRS transmission. The indication of the SRS resources may be received in downlink control information, e.g., in a group DCI or a unicast DCI. When the group DCI is used, the UE identifiers (as described above) are used. The indication of the SRS resources may be included in a message received after the reception of the SRS configuration. The message including the indication of the SRS resources may be the first message received after the transmission of the SRS configuration. The UE transmits the uplink SRS (block 1409). The uplink SRS is transmitted in accordance with the SRS resources as indicated.

Figure 15:
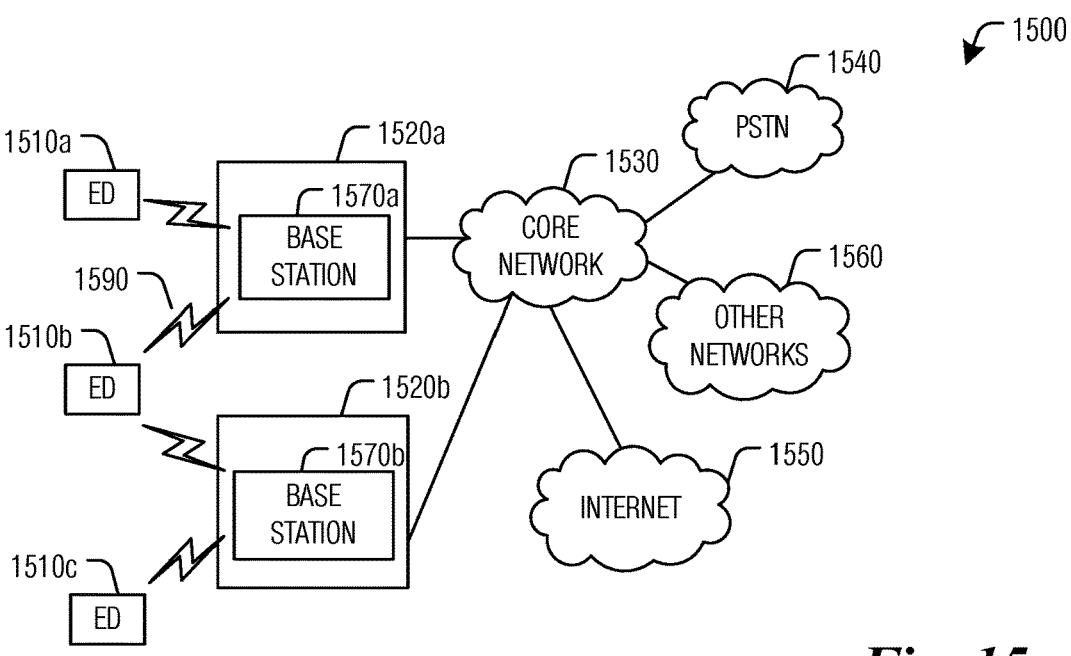
FIG. 15 illustrates an example communication system according to example embodiments presented herein.

FIG. 15 illustrates an example communication system 1500. In general, the system 1500 enables multiple wireless or wired users to transmit and receive data and other content. The system 1500 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1500 includes electronic devices (ED) 1510*a*-1510*c*, radio access networks (RANs) 1520*a*-1520*b*, a core network 1530, a public switched telephone network (PSTN) 1540, the Internet 1550, and other networks 1560. While certain numbers of these components or elements are shown in FIG. 15, any number of these components or elements may be included in the system 1500.

The EDs 1510*a*-1510*c* are configured to operate or communicate in the system 1500. For example, the EDs 1510*a*-1510*c* are configured to transmit or receive via wireless or wired communication channels. Each ED 1510*a*-1510*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1520*a*-1520*b* here include base stations 1570*a*-1570*b*, respectively. Each base station 1570*a*-1570*b* is configured to wirelessly interface with one or more of the EDs 1510*a*-1510*c* to enable access to the core network 1530, the PSTN 1540, the Internet 1550, or the other networks 1560. For example, the base stations 1570*a*-1570*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1510*a*-1510*c* are configured to interface and communicate with the Internet 1550 and may access the core network 1530, the PSTN 1540, or the other networks 1560.

In the embodiment shown in FIG. 15, the base station 1570*a* forms part of the RAN 1520*a*, which may include other base stations, elements, or devices. Also, the base station 1570*b* forms part of the RAN 1520*b*, which may include other base stations, elements, or devices. Each base station 1570*a*-1570*b* operates to transmit or receive wireless signals within a particular geographic region or area, sometimes referred to as a "cell." In some embodiments, multiple-input multiple-output (MIMO) technology may be employed having multiple transceivers for each cell.

The base stations 1570*a*-1570*b* communicate with one or more of the EDs 1510*a*-1510*c* over one or more air interfaces 1590 using wireless communication links. The air interfaces 1590 may utilize any suitable radio access technology.

It is contemplated that the system 1500 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1520*a*-1520*b* are in communication with the core network 1530 to provide the EDs 1510*a*-1510*c* with voice, data, application, Voice over Internet Protocol (VoIP), or other services. Understandably, the RANs 1520*a*-1520*b* or the core network 1530 may be in direct or indirect communication with one or more other RANs (not shown). The core network 1530 may also serve as a gateway access for other networks (such as the PSTN 1540, the Internet 1550, and the other networks 1560). In addition, some or all of the EDs 1510*a*-1510*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 1550.

Although FIG. 15 illustrates one example of a communication system, various changes may be made to FIG. 15. For example, the communication system 1500 could include any number of EDs, base stations, networks, or other components in any suitable configuration.

Figure 16A:
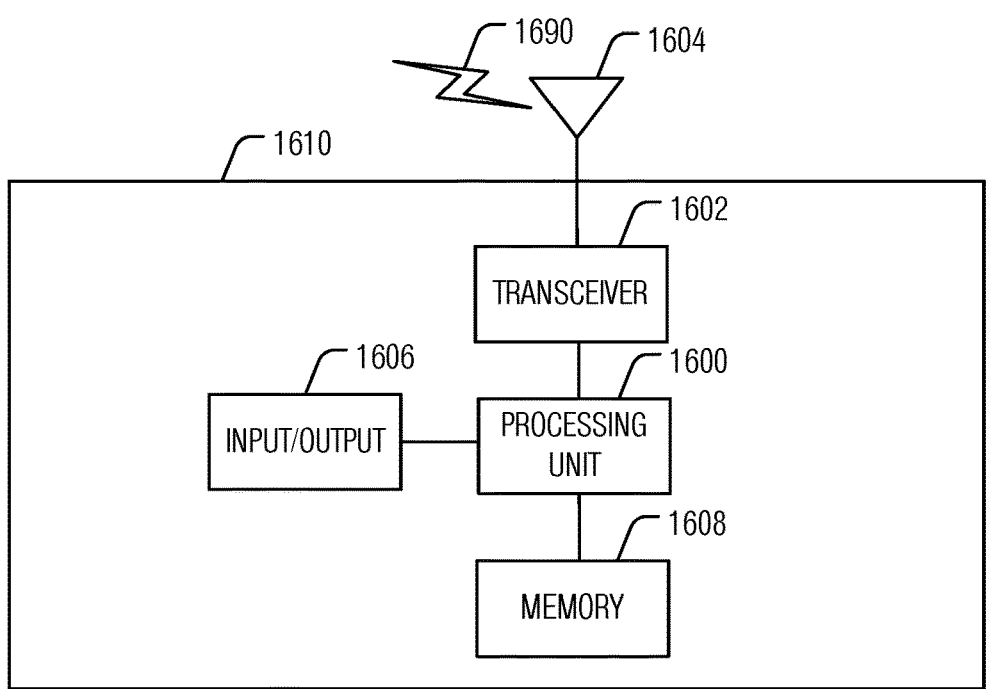
FIGS. 16A and 16B illustrate example devices that may implement the methods and teachings according to this disclosure.
Figure 16B:
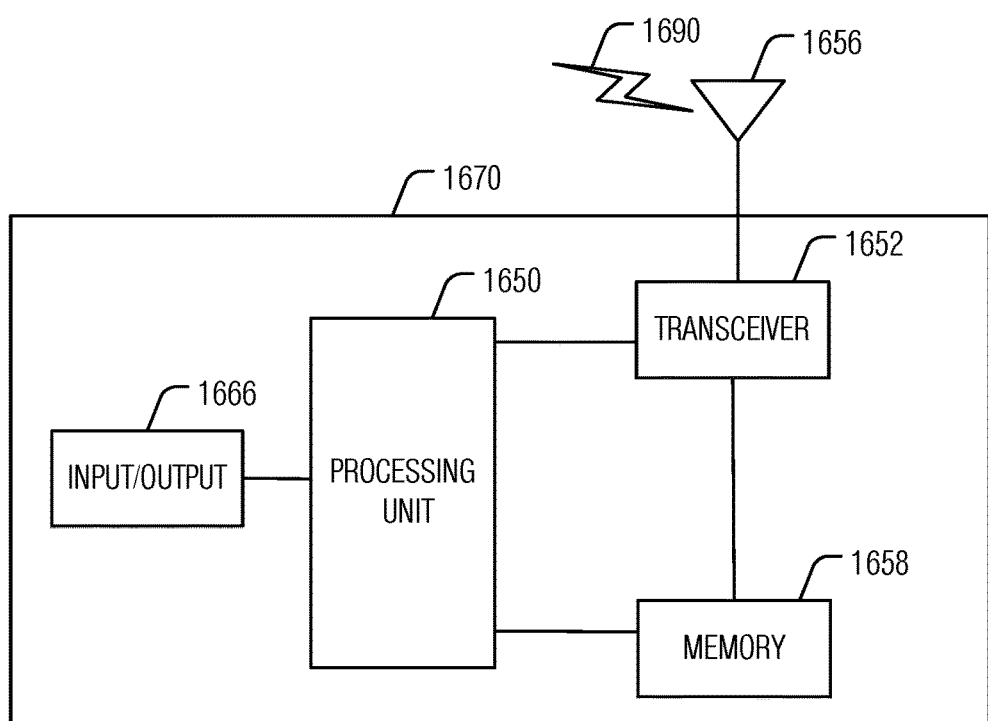

FIGS. 16A and 16B illustrate example devices that may implement the methods and teachings according to this disclosure. In particular, FIG. 16A illustrates an example ED 1610, and FIG. 16B illustrates an example base station 1670. These components could be used in the system 1500 or in any other suitable system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system 1500. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604. The transceiver 1602 is also configured to demodulate data or other content received by the at least one antenna 1604. Each transceiver 1602 includes any suitable structure for generating signals for wireless or wired transmission or processing signals received wirelessly or by wire. Each antenna 1604 includes any suitable structure for transmitting or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transmitter and at least one separate receiver.

The ED 1610 further includes one or more input/output devices 1606 or interfaces (such as a wired interface to the Internet 1550). The input/output devices 1606 facilitate interaction with a user or other devices (network communications) in the network. Each input/output device 1606 includes any suitable structure for providing information to or receiving information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station 1670 includes at least one processing unit 1650, at least one transceiver 1652, which includes functionality for a transmitter and a receiver, one or more antennas 1656, at least one memory 1658, and one or more input/output devices or interfaces 1666. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile or non-volatile storage and retrieval device(s). Each input/output device 1666 facilitates interaction with a user or other devices (network communications) in the network. Each input/output device 1666 includes any suitable structure for providing information to or receiving/providing information from a user, including network interface communications.

Figure 17:
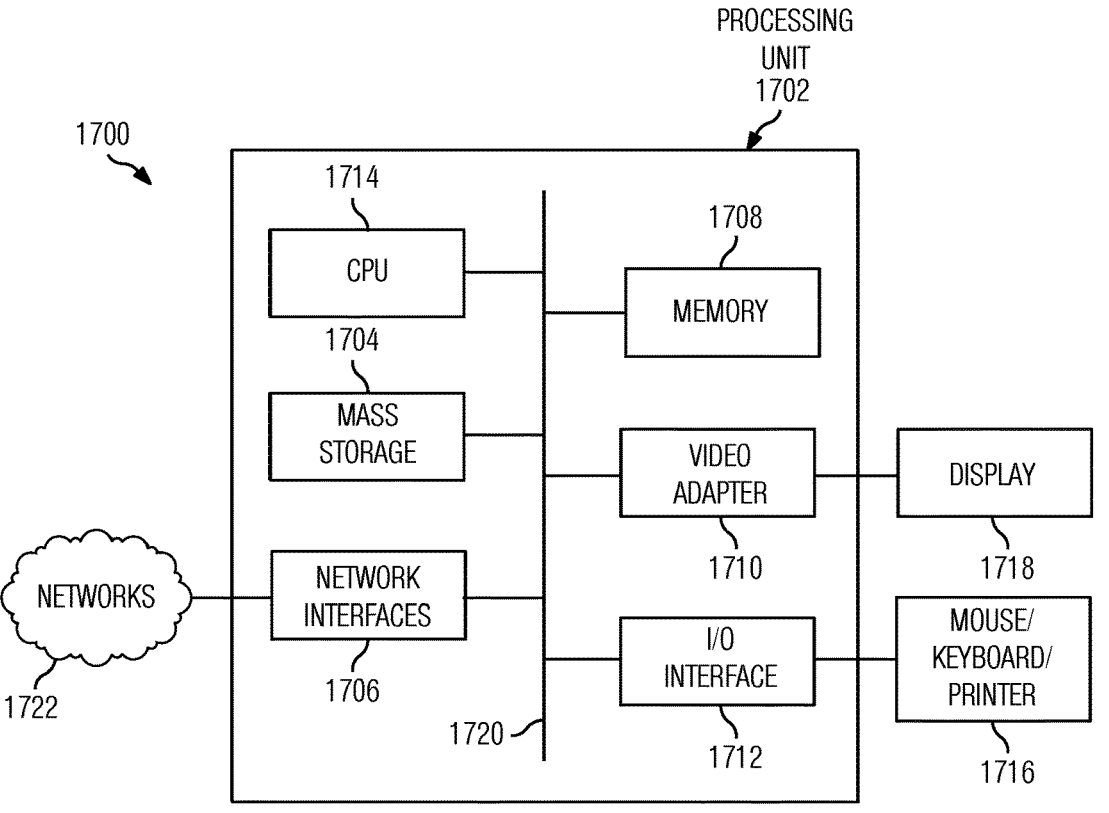
FIG. 17 is a block diagram of a computing system that may be used for implementing the devices and methods disclosed herein.

FIG. 17 is a block diagram of a computing system 1700 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse, keyboard, or printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit or module, a determining unit or module, or an assigning unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method implemented by an access node, the method comprising:

assigning, by the access node, a corresponding user equipment (UE) identifier to each UE in a subset of a plurality of UEs served by the access node, the UE identifiers being unique within the subset of the plurality of UEs served by the access node;

transmitting, by the access node, indications of the UE identifiers of UEs in the subset of the plurality of UEs served by the access node;

transmitting, by the access node to a UE served by the access node, configuration information of a sounding reference signal (SRS) resource with a plurality of sets of SRS ports, wherein each SRS port in the plurality of sets of SRS ports of the SRS resource is associated with a different corresponding set of parameters including a corresponding transmission comb, a corresponding offset associated with the corresponding transmission comb, a corresponding cyclic shift, and a corresponding orthogonal frequency division multiplex (OFDM) symbol, and wherein the UE is one of the subset of the plurality of UEs served by the access node, the transmitting the configuration information comprising:

for each UE in the subset of the plurality of UEs served by the access node, transmitting, by the access node, an indication of the corresponding UE identifier associated with the each UE, a transmit power control (TPC) command associated with an SRS, and corresponding SRS configuration information associated with the each UE, the corresponding SRS configuration information including an indication of a set of SRS port resources and an indication of an association between the SRS port resources and downlink port resources;

transmitting, by the access node to the UE, an indication of an association between a set of SRS ports in the plurality of sets of SRS ports of the SRS resource and a set of downlink channel state information reference signal (CSI-RS) ports for downlink channel state information; and transmitting, by the access node to the UE, an indication for an SRS transmission in a group downlink control information (DCI) message, the indication indicating the set of SRS ports in the plurality of sets of SRS ports of the SRS resource, the transmitting the indication for the SRS transmission comprising:

for each UE in the subset of the plurality of UEs served by the access node, transmitting, by the access node, a corresponding TPC command associated with the each UE and the indication indicating the set of SRS ports in the plurality of sets of SRS ports.

2. The method of claim 1, the indication of the set indicating one of the plurality of sets of SRS ports.

3. The method of claim 2, each of the plurality of sets of SRS ports being associated with a unique index.

4. The method of claim 3, the indication of the set specifying an index associated with the set of SRS ports.

5. The method of claim 1, further comprising:

receiving, by the access node from the UE, the SRS transmission in accordance with the set of SRS ports.

6. The method of claim 1, the configuration information being transmitted in a higher layer message.

7. The method of claim 1, the UE identifiers being configured in a higher layer message.

8. The method of claim 1, the indications of the UE identifiers being transmitted in a second group DCI message.

9. A method implemented by an access node, the method comprising:

assigning, by the access node, a corresponding user equipment (UE) identifier to each UE in a subset of a plurality of UEs served by the access node, the UE identifiers being unique within the subset of the plurality of UEs served by the access node;

transmitting, by the access node, indications of the UE identifiers of UEs in the subset of the plurality of UEs served by the access node;

transmitting, by the access node to a UE, sounding reference signal (SRS) configuration information, the SRS configuration information comprising associations between SRS ports and downlink channel state information reference signal (CSI-RS) ports, wherein each SRS port in the SRS ports is associated with a different corresponding set of parameters including a corresponding transmission comb, a corresponding offset associated with the corresponding transmission comb, a corresponding cyclic shift, and a corresponding orthogonal frequency division multiplex (OFDM) symbol, and wherein the UE is one of the subset of the plurality of UEs served by the access node, the transmitting the SRS configuration information comprising:

for each UE in the subset of the plurality of UEs served by the access node, transmitting, by the access node, an indication of the corresponding UE identifier associated with the each UE, a transmit power control (TPC) command associated with an SRS, and corresponding SRS configuration information associated with the each UE, the corresponding SRS configuration information including an indication of a set of SRS port resources and an indication of an association between the SRS port resources and downlink port resources;

transmitting, by the access node to the UE, an indication of one association between an SRS port and a downlink RS port of the associations between the SRS ports and the downlink CSI-RS ports for downlink channel state information; and transmitting, by the access node to the UE, an indication for an SRS transmission in a group downlink control information (DCI) message, the indication indicating a set of SRS ports in a plurality of sets of SRS ports of an SRS resource, the transmitting the indication for the SRS transmission comprising:

for each UE in the subset of the plurality of UEs served by the access node, transmitting, by the access node, a corresponding TPC command associated with the each UE and the indication indicating the set of SRS ports in the plurality of sets of SRS ports.

10. The method of claim 9, the SRS ports being SRS port resources indicated as a subset of a set of an ordering of the SRS port resources.

11. The method of claim 9, the SRS configuration information being transmitted in a higher layer message.

12. An access node comprising:

a non-transitory memory storage comprising instructions; and one or more processors in communication with the non-transitory memory storage, wherein the one or more processors execute the instructions to cause the access node to perform:

assigning a corresponding user equipment (UE) identifier to each UE in a subset of a plurality of UEs served by the access node, the UE identifiers being unique within the subset of the plurality of UEs served by the access node;

transmitting indications of the UE identifiers of UEs in the subset of the plurality of UEs served by the access node;

transmitting, to a UE served by the access node, configuration information of a sounding reference signal (SRS) resource with a plurality of sets of SRS ports, wherein each SRS port in the plurality of sets of SRS ports of the SRS resource is associated with a different corresponding set of parameters including a corresponding transmission comb, a corresponding offset associated with the corresponding transmission comb, a corresponding cyclic shift, and a corresponding orthogonal frequency division multiplex (OFDM) symbol, and wherein the UE is one of the subset of the plurality of UEs served by the access node, the transmitting the configuration information comprising:

for each UE in the subset of the plurality of UEs served by the access node, transmitting an indication of the corresponding UE identifier associated with the each UE, a transmit power control (TPC) command associated with an SRS, and corresponding SRS configuration information associated with the each UE, the corresponding SRS configuration information including an indication of a set of SRS port resources and an indication of an association between the SRS port resources and downlink port resources;

transmitting, to the UE, an indication of an association between a set of SRS ports in the plurality of sets of SRS ports of the SRS resource and a set of downlink channel state information reference signal (CSI-RS) ports for downlink channel state information; and transmitting, to the UE, an indication for an SRS transmission in a group downlink control information (DCI) message, the indication indicating the set of SRS ports in the plurality of sets of SRS ports of the SRS resource, the transmitting the indication for the SRS transmission comprising:

for each UE in the subset of the plurality of UEs served by the access node, transmitting a corresponding TPC command associated with the each UE and the indication indicating the set of SRS ports in the plurality of sets of SRS ports.

13. The access node of claim 12, the indication of the set indicating one of the plurality of sets of SRS ports.

14. The access node of claim 13, each of the plurality of sets of SRS ports being associated with a unique index.

15. The access node of claim 14, the indication of the set specifying an index associated with the set of SRS ports.

16. The access node of claim 12, the one or more processors executing the instructions to:

receive, from the UE, the SRS transmission in accordance with the set of SRS ports.

17. The access node of claim 12, the configuration information being transmitted in a higher layer message.

18. The access node of claim 12, the UE identifiers being configured in a higher layer message.

19. The access node of claim 12, the indications of the UE identifiers being transmitted in a second group DCI message.

20. An access node comprising:

a non-transitory memory storage comprising instructions; and one or more processors in communication with the non-transitory memory storage, wherein the one or more processors execute the instructions to cause the access node to perform:

assigning a corresponding user equipment (UE) identifier to each UE in a subset of a plurality of UEs served by the access node, the UE identifiers being unique within the subset of the plurality of UEs served by the access node;

transmitting indications of the UE identifiers of UEs in the subset of the plurality of UEs served by the access node;

transmitting, to a UE, sounding reference signal (SRS) configuration information, the SRS configuration information comprising associations between SRS ports and downlink channel state information reference signal (CSI-RS) ports, wherein each SRS port in the SRS ports is associated with a different corresponding set of parameters including a corresponding transmission comb, a corresponding offset associated with the corresponding transmission comb, a corresponding cyclic shift, and a corresponding orthogonal frequency division multiplex (OFDM) symbol, and wherein the UE is one of the subset of the plurality of UEs served by the access node, the transmitting the SRS configuration information comprising:

for each UE in the subset of the plurality of UEs served by the access node, transmitting an indication of the corresponding UE identifier associated with the each UE, a transmit power control (TPC) command associated with an SRS, and corresponding SRS configuration information associated with the each UE, the corresponding SRS configuration information including an indication of a set of SRS port resources and an indication of an association between the SRS port resources and downlink port resources;

transmitting, to the UE, an indication of one association between an SRS port and a downlink RS port of the associations between the SRS ports and the downlink CSI-RS ports for downlink channel state information; and transmitting, to the UE, an indication for an SRS transmission in a group downlink control information (DCI) message, the indication indicating a set of SRS ports in a plurality of sets of SRS ports of an SRS resource, the transmitting the indication for the SRS transmission comprising:

for each UE in the subset of the plurality of UEs served by the access node, transmitting, by the access node, a corresponding TPC command associated with the each UE and the indication indicating the set of SRS ports in the plurality of sets of SRS ports.

21. The access node of claim 20, the SRS ports being SRS port resources indicated as a subset of a set of an ordering of the SRS port resources.

22. The access node of claim 20, the SRS configuration information being transmitted in a higher layer message.

\* \* \* \* \*